United States Patent
Iwata et al.

(10) Patent No.: US 12,328,521 B2
(45) Date of Patent: Jun. 10, 2025

(54) PHOTOELECTRIC CONVERSION DEVICE, AND APPARATUS

(71) Applicant: CANON KABUSHIKI KAISHA, Tokyo (JP)

(72) Inventors: Koichiro Iwata, Kanagawa (JP); Yoshiaki Takada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 73 days.

(21) Appl. No.: 18/174,365

(22) Filed: Feb. 24, 2023

(65) Prior Publication Data
US 2024/0031708 A1    Jan. 25, 2024

(30) Foreign Application Priority Data
Feb. 28, 2022    (JP) ................. 2022-029296

(51) Int. Cl.
| | |
|---|---|
| H04N 25/78 | (2023.01) |
| H04N 23/667 | (2023.01) |
| H04N 25/65 | (2023.01) |

(52) U.S. Cl.
CPC .......... *H04N 25/78* (2023.01); *H04N 23/667* (2023.01); *H04N 25/65* (2023.01)

(58) Field of Classification Search
CPC ....... H04N 25/78; H04N 25/65; H04N 23/667
See application file for complete search history.

(56) References Cited

U.S. PATENT DOCUMENTS

| | | | |
|---|---|---|---|
| 2006/0261254 A1 | 11/2006 | Suzuki | |
| 2007/0262238 A1 | 11/2007 | Takashima | |
| 2015/0319384 A1* | 11/2015 | Onishi | H04N 25/778 |
| | | | 348/300 |
| 2017/0359524 A1* | 12/2017 | Hosono | H04N 5/2621 |

FOREIGN PATENT DOCUMENTS

| | | |
|---|---|---|
| JP | 2004207505 A | 7/2004 |
| JP | 2005260447 A | 9/2005 |
| JP | 2007271463 A | 10/2007 |
| JP | 2011124786 A | 6/2011 |

* cited by examiner

*Primary Examiner* — Yogesh K Aggarwal
(74) *Attorney, Agent, or Firm* — Canon U.S.A., Inc. IP Division

(57) ABSTRACT

A pixel is configured to output a signal. An input node is configured to input the signal. A holding circuit is configured to hold the signal input to the input node. An amplifier is configured to input the signal held in the holding circuit. An output node is configured to output the signal from the amplifier. An input switch is connected in series between the input node and the holding circuit. An output switch is connected in series between the amplifier and the output node. In a first operation mode, the output switch is in an on state, and the input switch is turned on or off at a predetermined timing to hold the signal in the holding circuit. In a second operation mode, the input switch and the output switch are an off state and the amplifier outputs a constant voltage.

22 Claims, 11 Drawing Sheets

PHOTOELECTRIC CONVERSION DEVICE, AND APPARATUS

BACKGROUND

Field of the Disclosure

The disclosure relates to a photoelectric conversion device and equipment.

Description of the Related Art

A photoelectric conversion device includes a plurality of signal processing circuits, and a technique for controlling each signal processing circuit has been introduced. Japanese Patent Application Laid-Open No. 2005-260447 describes a technique to reduce current of a signal processing circuit that is not used in a plurality of signal processing circuits, thereby reducing power consumption.

SUMMARY

A photoelectric conversion device includes a pixel, an input node, a holding circuit, an amplifier, an output node, an input switch, and an output switch. The pixel is configured to output a signal according to an amount of received light. The input node is configured to input the signal. The holding circuit is configured to hold the signal input to the input node. The amplifier is configured to input the signal held in the holding circuit. The output node is configured to output the signal from the amplifier. The input switch is connected in series between the input node and the holding circuit. The output switch is connected in series between the amplifier and the output node. In a first operation mode, the output switch is in an on state, and the input switch is turned on or off at a predetermined timing to hold the signal in the holding circuit. In a second operation mode, the input switch and the output switch are an off state and the amplifier outputs a constant voltage.

A photoelectric conversion device includes a pixel, an input node, a holding circuit, an amplifier, an output node, an input switch, and an output switch. The pixel is configured to output a signal according to the amount of incident light. The input node is configured to input the signal. The holding circuit is configured to hold the signal input to the input node. The amplifier is configured to input the signal held in the holding circuit. The output node is configured to output the signal from the amplifier. The input switch is connected in series between the input node and the holding circuit. The output switch is connected in series between the amplifier and the output node. In a first operation mode, the output switch is in an on state, and the input switch is turned on or off at a predetermined timing to hold the signal in the holding circuit. In a second operation mode, the output switch is off state and the input switch is an on state to input the signal of the input node to the amplifier.

Further features of the present disclosure will become apparent from the following description of exemplary embodiments with reference to the attached drawings.

DESCRIPTION OF THE EMBODIMENTS

In the technique described in Japanese Patent Application Laid-Open No. 2005-260447, if the power supply current of the unused signal processing circuit is lowered, the recovery time of the signal processing circuit becomes longer. Further, image quality degradation may occur due to current fluctuation at the time of recovery. The present disclosure relates to a technique for solving the problem at the time of recovery of a signal processing circuit.

First Embodiment

Figure 1:
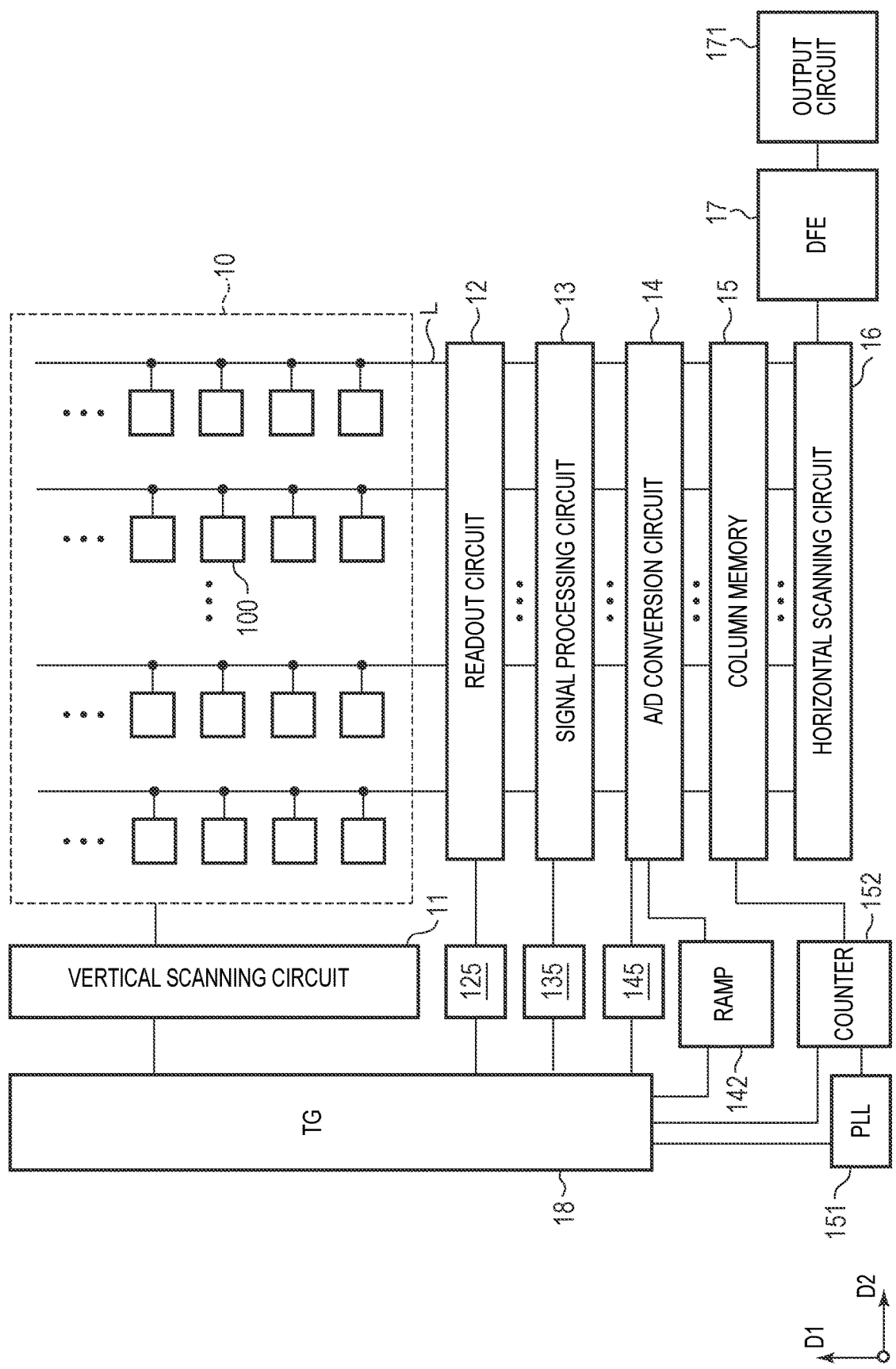
FIG. 1 is a block diagram of a photoelectric conversion device according to a first embodiment.

FIG. 1 is a block diagram of a photoelectric conversion device according to the present embodiment. The photoelectric conversion device is formed on a semiconductor substrate, and may be a CMOS image sensor for example. On the semiconductor substrate, a pixel array 10, a vertical scanning circuit 11, a readout circuit 12, a signal processing circuit 13, an A/D (Analog to Digital) conversion circuit 14, a column memory 15, a horizontal scanning circuit 16, a DFE (Digital Front End) circuit 17, an output circuit 171, a timing generator 18, circuit units or assemblies 125, 135, 145, a reference signal generation circuit (lamp) 142, a PLL (Phase Locked Loop) circuit 151, and a counter 152 are formed.

The pixel array 10 is arranged in a matrix, and includes a plurality of pixels 100 that output pixel signals according to the amount of incident light. Each pixel 100 includes a photoelectric conversion circuit that generates and accumulates signal charges based on the incident light. In the following description, the row direction indicates the horizontal direction (direction D2) in FIG. 1, and the column direction indicates the vertical direction (direction D1) intersecting with the row direction D2 in FIG. 1. Microlenses and color filters may be disposed on the pixels 100. The color filters may consist of primary color filters of red, blue, and green, for example, and may be provided on the pixels 100 in accordance with the Bayer arrangement.

The pixel array 10 includes an opening pixel region and a light-shielding pixel region in which a light-shielding film is formed. A light-shielding film is not formed on the pixels 100 included in the opening pixel region, and a pixel signal corresponding to the incident light can be output. The light-shielding pixel region may be a horizontal optical black (HOB) pixel region arranged adjacent to the aperture pixel region in the row direction D2. A dark signal corresponding to a noise component is obtained from the pixels 100 in the light-shielding pixel region.

In addition, the pixel array 10 may be provided with a distance measurement row in which focus detection pixels for outputting pixel signals for focus detection are arranged, and a plurality of imaging rows in which imaging pixels for outputting pixel signals for generating an image are arranged. Signal lines L are connected to columns of a plurality of pixels 100 respectively, and the pixels 100 in the same column sequentially output pixel signals to a common signal line L.

The vertical scanning circuit 11 includes a shift register, a gate circuit, a buffer circuit, and the like, outputs a control signal to the pixels 100 based on a vertical synchronization signal, a horizontal synchronization signal, a clock signal, and the like, and drives the pixels 100 for each row.

The readout circuit 12 includes a current source for reading out a pixel signal of the pixel 100, a clamp circuit for clamping the pixel signal to a predetermined potential, a column amplifier circuit for signal amplification, and the like. The column amplifier circuit includes a plurality of feedback circuits which can be switched, and the readout circuit 12 can change the amplification factor (gain) of the pixel signals according to the readout mode. For example, the readout circuit 12 can switch between a high gain mode and a low gain mode. The readout circuit 12 reads out the pixel signals from the pixels 100 via the signal line L. The circuit unit or assembly 125 includes a pulse generation circuit for controlling the readout circuit 12 and a reference bias circuit for generating a bias voltage and a clamp voltage of the readout circuit 12.

The signal processing circuit 13 includes a holding portion or circuit that samples and holds an analog signal output from the readout circuit 12, and an amplifier that buffers (buffers and amplifies) the held signal. This amplifier is an amplifier circuit that performs non-inverting amplification. The circuit unit or assembly 135 includes a pulse generation circuit for controlling the signal processing circuit 13 and a reference bias circuit for the signal processing circuit 13. As described later, the signal processing circuit 13 can switch the signal path in the signal processing circuit 13 according to the high gain mode and the low gain mode.

The A/D conversion circuit 14 includes a comparison circuit, a latch circuit, and the like, and converts an analog signal from the signal processing circuit 13 into a digital signal. The circuit unit or assembly 145 includes a pulse generation circuit for controlling the A/D conversion circuit 14 and a reference bias circuit for generating a bias voltage of the A/D conversion circuit 14. The reference signal generation circuit (RAMP) 142 generates a reference signal to be compared with a pixel signal by the A/D conversion circuit 14. The reference signal is a signal that may be changed depending on time, and is also referred to as a RAMP signal. The reference signal generation circuit 142 may be configured using various circuits such as a capacitive charge/discharge circuit, a DAC (Digital to Analog Converter) circuit, and a current steering circuit. The reference signal may be not only an upslope signal in which the voltage increases over time but also a downslope signal in which the voltage decreases over time. Further, the reference signal may include a plurality of slope waveforms having different voltage change rates per unit time. The comparison circuit of the A/D conversion circuit 14 compares the reference signal with the pixel signal, and outputs a comparison signal indicating the comparison result.

The column memory 15 holds the value of the counter 152 in accordance with the inversion of the comparison signal of the A/D conversion circuit 14. The counter 152 counts up or counts down the count value in synchronization with the reference signal. The counter 152 starts counting the clock pulses simultaneously with the start of the voltage change of the reference signal of the reference signal generation circuit 142, and outputs the count value. The PLL circuit 151 includes a clock circuit for generating a reference clock of the counter 152, and outputs a reference clock synchronized with the reference signal.

The horizontal scanning circuit 16 includes a decoder and a shift register, sequentially reads the count values as digital signals held in the column memory 15, and outputs the digital signals to the DFE 17.

The DFE 17 includes a digital signal processor, and performs digital signal processing such as digital gain, digital correlated double sampling, digital offset, linearity correction. The output circuit 171 includes a LVDS (Low Voltage Differential Signaling) serial output circuit, and outputs the signal-processed digital signal to the outside of the photoelectric conversion device at high speed and at low power consumption.

The timing generator 18 includes a clock circuit, a logic circuit, and the like, and generates control signals for controlling each part of the photoelectric conversion device.

Figure 2:
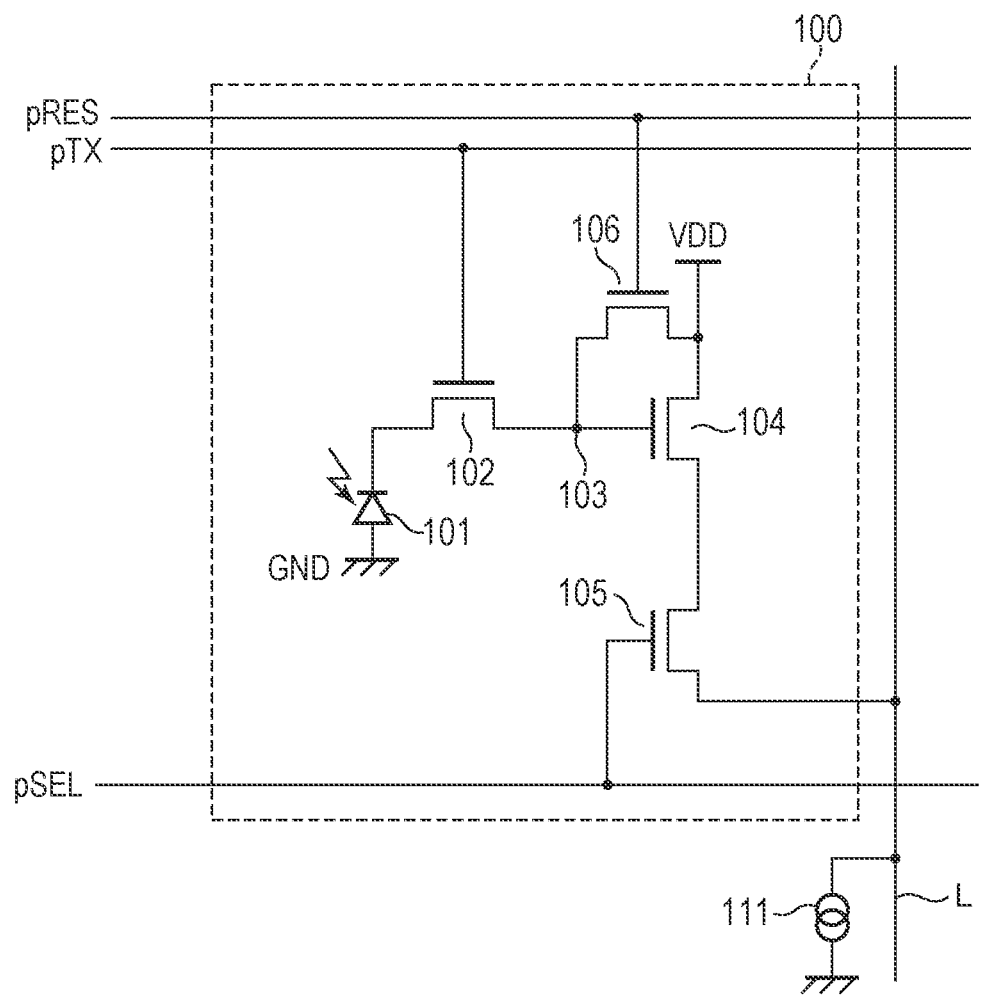
FIG. 2 is a circuit diagram of a pixel according to the first embodiment.

FIG. 2 is an equivalent circuit diagram of the pixel 100 in the present embodiment. The pixel 100 includes a photoelectric conversion portion or circuit 101, a transfer transistor 102, a floating diffusion region 103, an amplification transistor 104, a selection transistor 105, and a reset transistor 106. The following description shows an example in which the transistors constituting the pixel 100 are N-channel MOS transistors. The photoelectric conversion circuit 101 includes, for example, a photodiode, and performs photoelectric conversion by incident light and accumulation of charges. Note that the photoelectric conversion circuit 101 is not limited to a photodiode, and may be made of any material capable of causing a photoelectric effect. The number of photoelectric conversion circuits 101 per pixel 100 is not limited, and two, four, or more photoelectric conversion circuits 101 may be provided so as to share one microlens. Further, by configuring a buried photodiode, dark current noise can be reduced. The photoelectric conversion circuit 101 is provided with a microlens, and light concentrated by the microlens is incident on the photoelectric conversion circuit 101.

The transfer transistor 102 is provided corresponding to the photoelectric conversion circuit 101, and a control signal pTX is applied from the vertical scanning circuit 11 to the gate of the transfer transistor 102. When the control signal pTX becomes the high level, the transfer transistor 102 is turned on (conductive state), and the signal charges accumulated in the photoelectric conversion circuit 101 are transferred to the floating diffusion region 103 formed by the gate of the amplification transistor 104. When the control signal pTX becomes the low level, the transfer transistor 102 is turned off (nonconductive state). The floating diffusion region 103 converts a signal charge into a voltage, and the amplification transistor 104 outputs a signal voltage corresponding to the gate voltage from the source to the signal line L through the selection transistor 105. The drain of the amplification transistor 104 is connected to a power supply VDD.

A source of the reset transistor 106 is connected to the floating diffusion region 103, a drain of the reset transistor 106 is connected to the power supply VDD, and a control signal pRES is applied from the vertical scanning circuit 11 to a gate of the reset transistor 106. When the control signal pRES becomes the high level, the reset transistor 106 is turned on, and the voltage of the power supply VDD is supplied to the floating diffusion region 103. The selection transistor 105 is provided between the amplification transistor 104 and the signal line L, and a control signal pSEL is supplied from the vertical scanning circuit 11 to the gate of the selection transistor 105. When the control signal pSEL becomes the high level, the amplification transistor 104 and the signal line L are electrically connected. A current source 111 is connected to the signal line L, and the current source 111 supplies a constant bias current to the source of the amplification transistor 104 through the signal line L. The amplification transistor 104 operates as a source follower transistor.

Note that the pixel 100 is not limited to the structure illustrated in FIG. 2, and a plurality of selection transistors may be provided in each pixel 100. Further, additional capacitance may be added to the floating diffusion region, and the capacitance of the floating diffusion region may be selectable.

Figure 3:
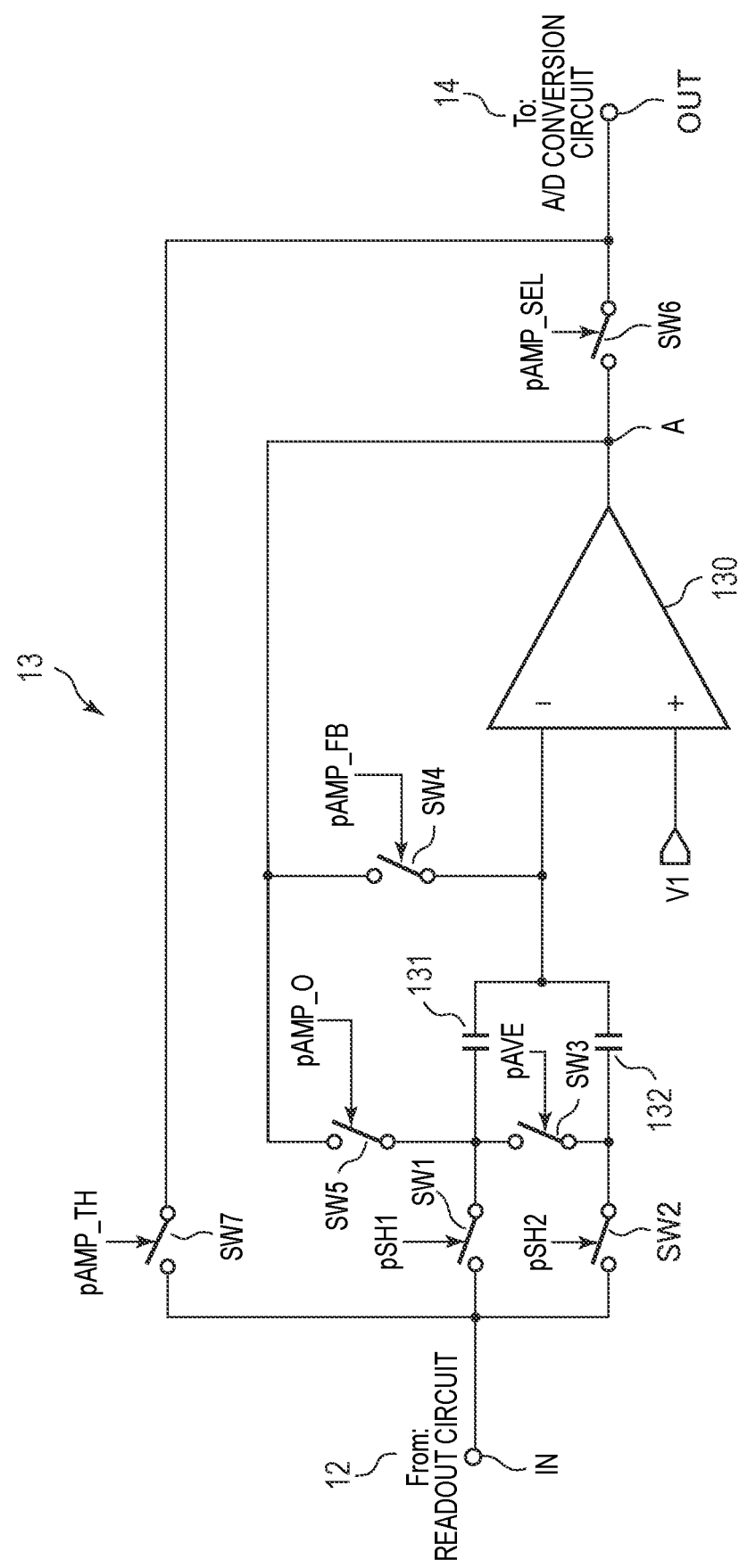
FIG. 3 is a circuit diagram of a signal processing circuit according to the first embodiment.

FIG. 3 is an equivalent circuit diagram of the signal processing circuit 13 according to the present embodiment, and illustrates a circuit for one column. In practice, the signal processing circuit 13 may include the same number of circuits as the number of signal lines L. The signal processing circuit 13 includes an amplifier 130, switches or circuits SW1 to SW7, holding portions, parts, or circuits 131 and 132, an input node IN, and an output node OUT, and the signal processing circuit 13 operates as a signal holding portion or circuit that holds a signal from the readout circuit 12.

The amplifier 130 includes a plurality of transistors, and includes an inverting input terminal, a non-inverting input terminal, and an output terminal. Each of the switches SW1 to SW7 consists of transistor, and is controlled to be on (conductive) or off (nonconductive) by a voltage applied to a control node (gate node). Each of the holding circuit 131 (first holding circuit) and the holding circuit 132 (second holding circuit) consists of electrodes such as metal or polysilicon, a transistor, or the like, and forms a capacitor element (capacitor).

The switch SW1 (input switch, first switch) is connected in series between the input node IN and the holding circuit 131. That is, the first node of the switch SW1 is connected to the input node IN (the output node of the readout circuit 12), and the second node of the switch SW1 is connected to the first electrode of the holding circuit 131. A control signal pSH1 is input to the control node of the switch SW1. When the control signal pSH1 becomes the high level and the switch SW1 is turned on, a signal from the readout circuit 12 is input to the holding circuit 131. When the control signal pSH1 becomes the low level and the switch SW1 is turned off, the holding circuit 131 holds the signal.

Similarly, the switch SW2 (input switch, second switch) is connected in series between the input node IN and the holding circuit 132. That is, the first node of the switch SW2 is connected to the input node IN (the output node of the readout circuit 12), and the second node of the switch SW2 is connected to the first electrode of the holding circuit 132. A control signal pSH2 is input to the control node of the switch SW2. When the control signal pSH2 becomes the high level and the switch SW2 is turned on, a signal from the readout circuit 12 is input to the holding circuit 132. When the control signal pSH2 becomes the low level and the switch SW2 is turned off, the holding circuit 132 holds the signal.

The switch SW3 (third switch) is connected between the holding circuits 131 and 132. That is, the first node of the switch SW3 is connected to the second node of the switch SW1 and the first electrode of the holding circuit 131, and the second node of the switch SW3 is connected to the second node of the switch SW2 and the first electrode of the holding circuit 132. A control signal pAVE is input to the control node of the switch SW3. When the control signal pAVE becomes the high level and the switch SW3 is turned on, the holding circuits 131 and 132 are short-circuited, and the signals of the holding circuits 131 and 132 are averaged. When the control signal pAVE becomes the low level, the switch SW3 is turned off, and the holding circuits 131 and 132 can hold different signals respectively.

A first node of the switch SW4 (fourth switch) is connected to an output terminal (node A) of the amplifier 130, and a second node of the switch SW4 is connected to an inverting input terminal of the amplifier 130. A control signal pAMP_FB is input to the control node of the switch SW4. When the control signal pAMP_FB becomes the high level and the switch SW4 is turned on, the output terminal and the inverting input terminal of the amplifier 130 are connected. At this time, the gain of the amplifier 130 is 1, and the amplifier 130 operates as a voltage follower. A non-inverting input terminal of the amplifier 130 is connected to a constant voltage line, and the amplifier 130 outputs a constant voltage V1. When the control signal pAMP_FB becomes the low level and the switch SW4 is turned off, the output terminal and the inverting input terminal of the amplifier 130 are disconnected.

A first node of the switch SW5 (fifth switch) is connected to an output terminal of the amplifier 130, and a second node of the switch SW5 is connected to a connection node between the holding circuit 131 and the switch SW1. A control signal pAMP_O is applied to the control node of the switch SW5. When the control signal pAMP_O becomes the high level and the switch SW5 is turned on, the first electrode of the holding circuit 131 and the output terminal of the amplifier 130 are connected. When the control signal pAMP_O becomes the low level and the switch SW5 is turned off, the first electrode of the holding circuit 131 and the output terminal of the amplifier 130 are disconnected.

The switch SW6 (output switch) is connected in series between the amplifier 130 and the output node OUT. That is, the first node of the switch SW6 is connected to the output terminal (node A) of the amplifier 130, and the second node of the switch SW6 is connected to the output node OUT (input node of the A/D conversion circuit 14). A control signal pAMP_SEL is input to the control node of the switch SW6. When the control signal pAMP_SEL becomes the high level and the switch SW6 is turned on, the node A and the output node OUT are connected. When the control signal pAMP_SEL becomes the low level and the switch SW6 is turned off, the node A and the input node of the A/D conversion circuit 14 are disconnected.

The switch SW7 (short-circuit switch) is connected in series between the input node IN and the output node OUT. That is, the first node of the switch SW7 is connected to the input node IN, and the second node of the switch SW7 is connected to the output node OUT. A control signal pAM- P_TH is input to the control node of the switch SW7. When the control signal pAMP_TH becomes the high level and the switch SW7 is turned on, the input node IN and the output node OUT are short-circuited to form a signal path from the input node IN to the output node OUT. When the control signal pAMP_TH becomes the low level and the switch SW7 is turned off, the input node IN and the output node OUT are disconnected.

According to the above configuration, the signal path in the signal processing circuit 13 can be switched in accordance with the readout mode. In the high gain mode (first operation mode), noise reduction is performed using the holding circuits 131 and 132 and the amplifier 130. In the low gain mode (second operation mode), the holding circuits 131 and 132 and the amplifier 130 are disconnected from the signal path.

Figure 4:
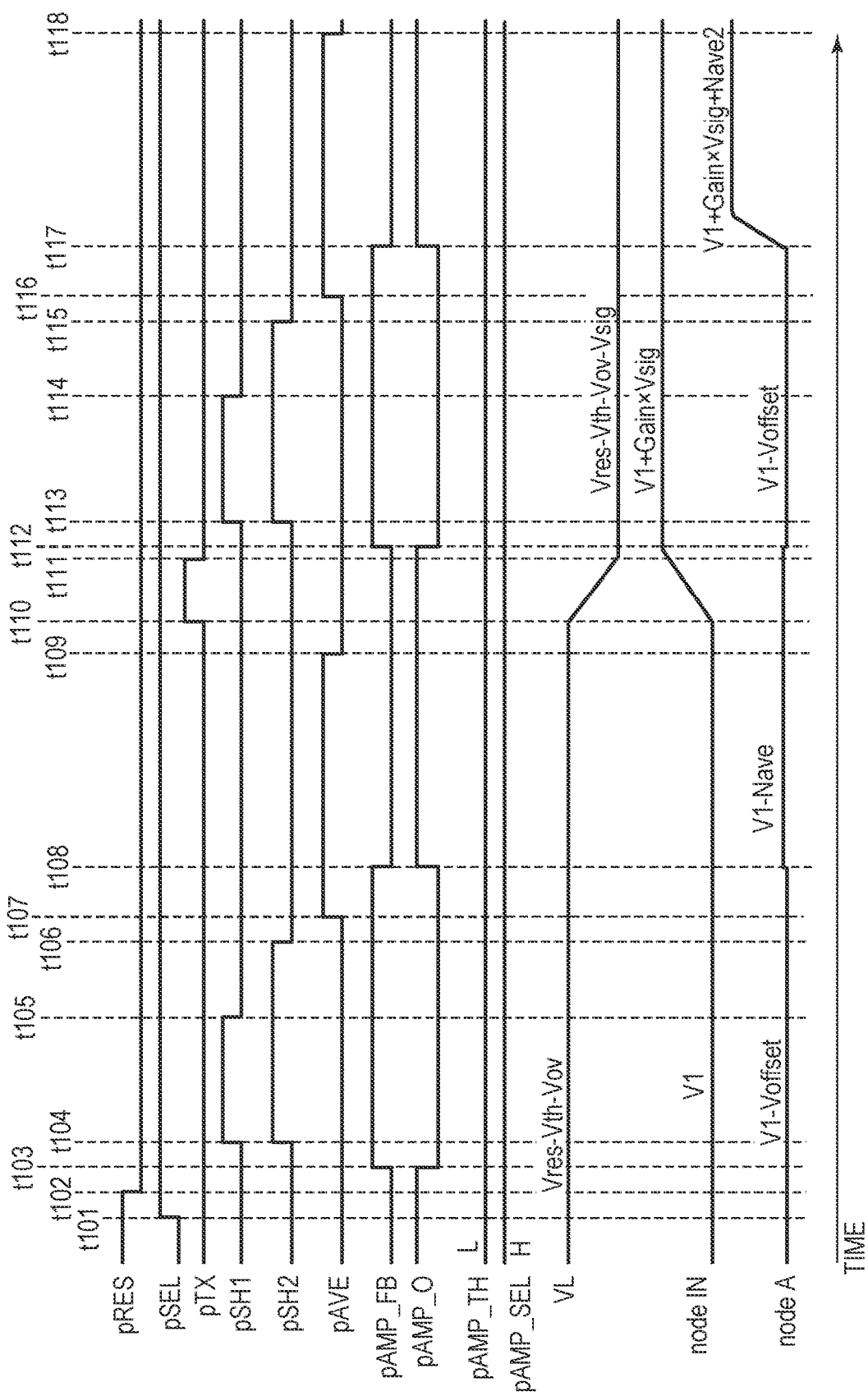
FIG. 4 is a timing chart illustrating a driving method of the photoelectric conversion device according to the first embodiment.

FIG. 4 is a timing chart illustrating a driving method of the photoelectric conversion device according to the present embodiment, and illustrates a driving method in which the holding circuits 131 and 132 and the amplifier 130 are used in the high gain mode.

The timing chart of FIG. 4 illustrates time changes of the control signals pRES, pSEL, pTX, pSH1, pSH2, pAVE, pAMP_FB, pAMP_O, pAMP_TH, pAMP_SEL, the voltage VL of the signal line L, the voltage of the input node IN (the output node of the readout circuit 12), and the voltage of the node A (the output terminal of the amplifier 130).

At time t101, the control signal pRES is at the high level, the reset transistor 106 of the pixel 100 is turned on, and the floating diffusion region 103 is reset. Further, the control signal pSEL changes from the low level to the high level, the selection transistor 105 of the pixel 100 is turned on, and the amplification transistor 104 and the signal line L are electrically connected to each other. Thereby, a signal at the time of the reset is output from the pixel 100 to the signal line L. At this time, the voltage VL in the signal line L is represented by the following Equation (1). Here, "Vres" denotes the reset level of the floating diffusion region 103, "Vth" denotes the threshold value of the amplification transistor 104, and "Vov" denotes the overdrive voltage for the desired current I.

$$VL = Vres - Vth - Vov \tag{1}$$

In the readout circuit 12, the voltage VL of the signal line L is clamped to a predetermined voltage, for example, a voltage V1. Therefore, the voltage VL represented in the Equation (1) is output from the readout circuit 12 as the voltage V1.

In the signal processing circuit 13, since the control signals pSH1 and pSH2 are at a low level and the switches SW1 and SW2 are in an off state, the input node IN and the holding circuits 131 and 132 are in a non-conductive state. Since the control signals pAVE, pAMP_FB, and pAMP_TH are at the low level, the switches SW3 and SW7 are in an off state. Since the control signals pAMP_O and pAMP_SEL are at the high level, the switches SW5 and SW6 are in an on state. The holding circuit 131 is connected between the output terminal and the inverting input terminal of the amplifier 130. At this time, when a charge is not held in the holding circuit 131, the voltage V1 can be output from the node A.

At time t102, the control signal pRES changes from the high level to the low level, the reset transistor 106 is turned off, and the floating diffusion region 103 is in the floating state. At this time, the potential of the floating diffusion region 103 may be varied due to the parasitic capacitance between the gate of the reset transistor 106 and the diffusion layer. Note that in the following description, it is assumed that the potential of each node does not change due to transition of on or off state in the reset transistor 106.

From time t102 to time t103, the readout circuit 12 clamps the pixel signal at the time of the reset to a predetermined voltage, for example, a voltage V1. Here, the clamp voltage is the same voltage as the voltage V1 input to the non-inverting input terminal of the amplifier 130, but may be a different voltage.

At time t103, the control signal pAMP_O changes from the high level to the low level, and the switch SW5 is turned off. Further, the control signal pAMP_FB changes from the low level to the high level, the switch SW4 is turned on, and the output terminal and the inverting input terminal of the amplifier 130 are electrically connected. The amplifier 130 operates as a voltage follower and outputs a voltage V1 from the output terminal. Here, when the amplifier 130 has the offset voltage Voffset, the voltage Va at the output terminal (node A) is represented by the Equation (2). Since the inverting input terminal of the amplifier 130 is connected to the node A, the voltage of the inverting input terminal also becomes the voltage (V1−Voffset).

$$Va = V1 - Voffset \tag{2}$$

At time t104, the control signals pSH1 and pSH2 change from the low level to the high level, and the switches SW1 and SW2 are turned on. The input node IN and the holding circuits 131 and 132 are electrically connected to each other, and a signal at the time of resetting is output from the readout circuit 12 to the holding circuits 131 and 132.

At time t105, the control signal pSH1 changes from the high level to the low level, the switch SW1 is turned off, and the holding circuit 131 holds the voltage of the input node. At this time, the voltage of the input node IN is represented by the Equation (3). Here, "Gain" denotes the gain of the readout circuit 12 and "Na" denotes the voltage of the signal (noise signal) at time t105. As described above, the gain of the readout circuit 12 can be changed according to the read mode.

$$V1 + Gain \times Na \tag{3}$$

The voltage between the first electrode and the second electrode of the holding circuit 131 is the difference between the voltage of the input node IN and the voltage of the inverting input terminal of the amplifier 130 at time t105. Accordingly, the voltage between the first electrode and the second electrode of the holding circuit 131 is represented by the Equation (4).

$$(3) - (2) = V1 + Gain \times Na - (V1 - Voffset) = Gain \times Na + Voffset \tag{4}$$

At time t106, the control signal pSH2 changes from the high level to the low level, the switch SW2 is turned off, and the holding circuit 132 holds the voltage of the input node IN. The voltage of the input node IN is represented by the Equation (5). Here, "Nb" denotes the voltage of the signal (noise signal) at time t106.

$$V1 + Gain \times Nb \tag{5}$$

The voltage between the first electrode and the second electrode of the holding circuit 131 becomes the difference between the voltage (Equation (5)) of the input node IN and the voltage (Equation (2)) of the inverting input terminal of the amplifier 130 at time t106. The voltage between the first electrode and the second electrode of the holding circuit 132 is represented by the Equation (6).

$$(5) - (2) = V1 + \text{Gain} \times Nb - (V1 - \text{Voffset}) = \text{Gain} \times Nb + \text{Voffset} \quad (6)$$

When the capacitance values of the holding circuits 131 and 132 are C1 [F] and C2 [F], respectively, the charges Q1 and Q2 held in the holding circuits 131 and 132 are represented by the Equations (7) and (8).

$$Q1 = C1 \times \text{Equation (4)} \quad (7)$$
$$Q1 = C1 \times \text{Equation (4)}$$
$$= C1 \times (\text{Gain} \times Na + \text{Voffset})$$
$$Q2 = C2 \times \text{Equation (6)} \quad (8)$$
$$= C2 \times (\text{Gain} \times Nb + \text{Voffset})$$

At time t107, the control signal pAVE changes from the low level to the high level, the switch SW3 is turned on, and the charge Q1 and the charge Q2 are added. The charge (Q1+Q2) after the addition is represented by the Equation (9).

$$Q1 + Q2 = \text{Equation (7)} + \text{Equation (8)} = \quad (9)$$
$$C1(\text{Gain} \times Na + \text{Voffset}) + C2 \times (\text{Gain} \times Nb + \text{Voffset})$$

When the capacitance values of the holding circuits 131 and 132 are both C1 [F], the Equation (9) is represented by the Equation (10). For simplicity of description, the offset voltage Voffset is omitted.

$$Q1+Q2=C1\times(\text{Gain}\times(Na+Nb)) \quad (10)$$

The charge (Q1+Q2) of Equation (10) is represented as the voltage of Equation (11).

$$(C1\times(\text{Gain}\times(Na+Nb)))/(2\times C1)=(\text{Gain}\times Na+\text{Gain}\times Nb)/2 \quad (11)$$

Since the noise signals Na and Nb are random components, the sum of the noise signals Na and Nb is represented by the sum of squares. Here, when Na=Nb, the sum of squares (squares average) Nave of the noise signals Na and Nb is represented by the Equation (12).

$$N\text{ave}=(\text{Gain}\times Na)/\sqrt{2} \quad (12)$$

According to the Equation (12), it is possible to reduce the noise with a period shorter than the time period from the falling time (time t105) of the control signal pSH1 to the falling time (time t106) of the control signal pSH2. That is, a high frequency noise can be reduced to $(1/\sqrt{2})$. On the other hand, the Equation (12) cannot average the noise with a period longer than the period from time t105 to time t106. That is, the Equation (12) does not average a noise with a lower frequency. Thus, the low frequency noise may be greater than the squared average $(1/\sqrt{2})$.

At time t108, the control signal pAMP_FB changes from the high level to the low level, and the switch SW4 is turned off. Further, the control signal pAMP_O changes from the low level to the high level, and the switch SW5 is turned on. Thereby, the amplifier 130 outputs the voltage Va corresponding to the voltages of the holding circuits 131 and 132.

Here, the voltage Va is represented by the Equation (13) in which the squared average Nave of the equation (12) and the voltage V1 are added.

$$Va=V1+N\text{ave} \quad (13)$$

From time t108 to time t109, the A/D conversion circuit 14 performs A/D conversion on the signal of the output node OUT, i.e., the voltage Va of Equation (13). The reference signal generation circuit 142 changes the reference signal with time, and a comparator in the A/D conversion circuit 14 compares the reference signal with the voltage Va and outputs a comparison signal. The column memory 15 holds the value of the counter 152 as a digital value of the voltage Va in accordance with the inversion of the comparison signal of the A/D conversion circuit 14.

At time t109, the control signal pAVE changes from the high level to the low level, and the switch SW3 is turned off.

At time t110, the control signal pTX changes from the low level to the high level, the transfer transistor 102 in the pixel 100 is turned on, and the charge accumulated in the photoelectric conversion circuit 101 is transferred to the floating diffusion region 103. The potential of the floating diffusion region 103 decreases according to the transferred charge, and the voltage VL of the signal line L also decreases. Here, the amount of change (amplitude) of the voltage VL of the signal line L at this time is expressed by "Vsig".

At time t111, the control signal pTX changes from the high level to the low level, the transfer transistor 102 is turned off, and a transfer of the charges to the floating diffusion region 103 ends. At this time, the voltage VL of the signal line L is represented by the Equation (14).

$$VL=V\text{res}-V\text{th}-V\text{ov}-V\text{sig} \quad (14)$$

The voltage of the output node of the readout circuit 12, i.e., the voltage of the input node IN of the signal processing circuit 13, is represented by the Equation (15).

$$V1+\text{Gain}\times V\text{sig} \quad (15)$$

At time t112, the control signal pAMP_FB changes from the low level to the high level, and the switch SW4 is turned on. Further, the control signal pAMP_O changes from the high level to the low level, and the switch SW5 is turned off. Thereby, similarly to the operation at time t103, the inverting input terminal and the output terminal of the amplifier 130 are electrically connected, and the voltage Va at the node A becomes (V1−Voffset) of the Equation (2).

At time t113, the control signals pSH1 and pSH2 change from the low level to the high level, the switches SW1 and SW2 are turned on, and the input node IN is electrically connected to each of the first electrodes of the holding circuits 131 and 132. That is, the voltage (V1+Gain×Vsig) of the Equation (15) is output to the first electrodes of the holding circuits 131 and 132.

At time t114, the control signal pSH1 changes from the high level to the low level, and the switch SW1 is turned off. At this time, the voltage of the first electrode of the holding circuit 131 includes the voltage (V1+Gain×Vsig) of the Equation (15) and the voltage of the noise signal at the time t114. The voltage of the first electrode of the holding circuit 131 is represented by the Equation (16), where "Nc" denotes the noise signal at time t114.

$$V1+\text{Gain}\times Nc+\text{Gain}\times V\text{sig} \quad (16)$$

The voltage held in the holding circuit 131 corresponds to a difference between the voltages of the first electrode and the second electrode. That is, the voltage held in the holding circuit 132 is the difference between the voltage (Equation (16)) of the input node IN at time t114 and the voltage (Equation (2)) of the inverting input terminal of the amplifier 130. Therefore, the voltage held in the holding circuit 131 is represented by the Equation (17).

$$\text{Equation (16)} - \text{Equation (2)} = \text{Gain} \times Nc + \text{Gain} \times V\text{sig} + V\text{offset} \quad (17)$$

At time t115, the control signal pSH2 changes from the high level to the low level, and the switch SW2 is turned off. The voltage at the first electrode of the holding circuit 132 is represented by the Equation (18) where "Nd" denotes the noise signal at time t115.

$$V1 + \text{Gain} \times Nd + \text{Gain} \times V\text{sig} \quad (18)$$

The voltage held in the holding circuit 132 corresponds to a difference between the voltages of the first electrode and the second electrode. That is, the voltage held in the holding circuit 132 is the difference between the voltage of the input node IN (Equation (18)) at the time t115 and the voltage of the inverting input terminal of the amplifier 130 (Equation (2)). Therefore, the voltage held in the holding circuit 132 is represented by the Equation (19).

$$\text{Equation (18)} - \text{Equation (2)} = \text{Gain} \times Nd + \text{Gain} \times V\text{sig} + V\text{offset} \quad (19)$$

At time t116, the control signal pAVE changes from the low level to the high level, the switch SW3 is turned on, and the signals held in the holding circuits 131 and 132 (Equations (17) and (19)) are averaged. The averaged signal may be calculated as described at time t107. That is, when Nc=Nd, the sum of squares (squares average) of the noise signals Nc and Nd is represented by the Equation (20).

$$\text{Gain} \times V\text{sig} + (\text{Gain} \times Nc)/\sqrt{2} \quad (20)$$

In the Equation (20), the noise signal Nc is reduced to $1/\sqrt{2}$. However, as described in the Equation (12), although the effect of reducing the noise signal Nc decreases in low frequency component, the noise of the frequency component higher than the period from the time t115 to the time t116 can be reduced by the squared average.

At time t117, the control signal pAMP_FB changes from the high level to the low level, and the switch SW4 is turned off. Further, the control signal pAMP_O changes from the low level to the high level, and the switch SW5 is turned on. Thereby, the amplifier 130 outputs the voltage Va corresponding to the voltages of the holding circuits 131 and 132. The voltage Va is represented by the Equation (21). The voltage Va at this time represents a signal at the time of photoelectric conversion of the pixel 100.

$$Va = V1 + \text{Gain} \times V\text{sig} + (\text{Gain} \times Nc)/\sqrt{2} = V1 + \text{Gain} \times V\text{sig} + N\text{ave}2 \quad (21)$$

From time t117 to time t118, the A/D conversion circuit 14 performs A/D conversion of the voltage Va described in the Equation (21). That is, the reference signal generation circuit 142 changes the reference signal with time, and the comparator in the A/D conversion circuit 14 compares the reference signal with the voltage Va and outputs a comparison signal. The column memory 15 holds the value of the counter 152 as a digital value of the voltage Va in accordance with the inversion of the comparison signal of the A/D conversion circuit 14. The DFE 17 calculates a difference value between the digital value (Equation (13)) at the time of resetting and the digital value (Equation (21)) at the time of photoelectric conversion, and performs correlated double sampling. The difference value is output from the output circuit 171 as a pixel signal.

In the timing chart of FIG. 4, the control signal pAMP_TH is at the low level at any time, and the switch SW7 keeps the off state. The control signal pAMP_SEL is at the high level at any time, and the switch SW6 keeps the on state. Therefore, a path for short-circuiting the input node IN and the output node OUT, that is, a path for bypassing the holding circuits 131 and 132 and the amplifier 130 is not formed. The signal from the readout circuit 12 is averaged by the holding circuits 131 and 132 and the amplifier 130, and the averaged signal is output from the signal processing circuit 13. That is, the random noise generated in the circuit preceding the signal processing circuit 13 is averaged, and the noise reduction effect can be achieved.

However, since the holding circuits 131 and 132 are capacitive elements, kTC noise may occur when the holding circuits 131 and 132 hold signals. In the low-gain mode, kTC noise caused by the holding circuits 131 and 132 cannot be ignored, and noise may increase. Therefore, in the low gain mode, it is preferable that the input node IN and the output node OUT in the signal processing circuit 13 are short-circuited, and the holding circuits 131 and 132 and the amplifier 130 are not used. On the other hand, in the high gain mode, the kTC noise is relatively small with respect to the signal, and the noise reduction effect by averaging the signal processing circuit 13 becomes larger. Therefore, by switching the signal path according to the gain mode, it is possible to realize noise reduction effectively by averaging while suppressing kTC noise.

Figure 5:
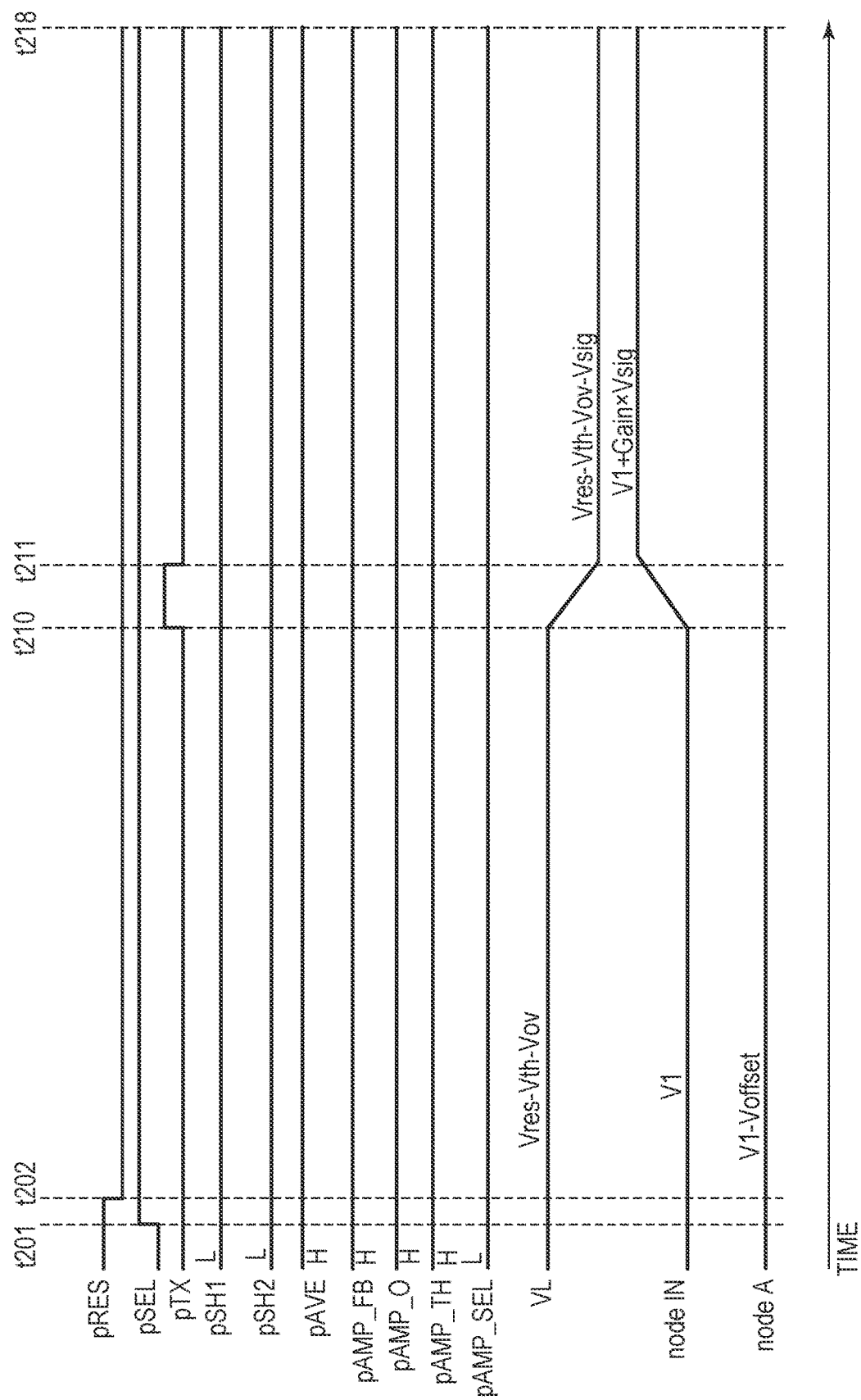
FIG. 5 is a timing chart illustrating a driving method of the photoelectric conversion device according to the first embodiment.

FIG. 5 is a timing chart illustrating the driving method of the photoelectric conversion device according to the present embodiment, and illustrates the driving method in the low gain mode. Hereinafter, differences with the timing chart of FIG. 4 will be mainly described.

The control signals pSH1, pSH2, and pAMP_SEL hold the low level, and the switches SW1, SW2, and SW6 are kept to be in the off state. Further, the control signal pAMP_TH holds the high level, and the switch SW7 is in the on state. Therefore, a signal path for short-circuiting the input node IN and the output node OUT of the signal processing circuit 13 is formed, and the holding circuits 131 and 132 and the amplifier 130 are isolated from the signal path. Therefore, the signal of the output node of the readout circuit 12 is directly output to the A/D conversion circuit 14 via the switch SW7.

The control signals pAVE, pAMP_FB, and pAMP_O hold the high level, and the switches SW3, SW4, and SW5 keep the on state. The inverting input terminal of the amplifier 130 is electrically connected to the output terminal, and the voltage of the non-inverting input terminal is fixed to the voltage V1. Therefore, the amplifier 130 continues to operate as a voltage follower that outputs a constant voltage (V1−Voffset). However, the voltage of the amplifier 130 is not output to the outside of the signal processing circuit 13.

In the timing chart of FIG. 5, the holding circuits 131 and 132 and the amplifier 130 are not used in a circuit unit or assembly other than the signal processing circuit 13. The readout circuit 12 and the A/D conversion circuit 14 process signals without passing through the signal processing circuit 13 as described below.

At time t201, the control signal pRES is at the high level, the reset transistor 106 of the pixel 100 is turned on, and the floating diffusion region 103 is reset. Further, the control signal pSEL changes from the low level to the high level, the selection transistor 105 of the pixel 100 is turned on, and the amplification transistor 104 and the signal line L are electrically connected to each other. Thus, the pixel signal at the time of resetting is output from the pixel 100 to the signal line L. The voltage VL of the signal line L becomes (Vres−Vth−Vov) as represented by the above Equation (1).

At time t202, the control signal pRES changes from the high level to the low level, and the reset transistor 106 is turned off. The readout circuit 12 clamps the pixel signal at the reset time to the voltage V1. The voltage of the output node of the readout circuit 12 is (V1+Gain×Na) as represented by the above Equation (3). At any one of the timings t202 to t210, the A/D conversion circuit 14 performs A/D conversion on the pixel signal output from the readout circuit 12.

At time t210, the control signal pTX changes from the low level to the high level, the transfer transistor 102 in the pixel 100 is turned on, and the charge accumulated in the photoelectric conversion circuit 101 is transferred to the floating diffusion region 103. The potential of the floating diffusion region 103 decreases according to the transferred charge, and the voltage VL of the signal line L also decreases.

At time t211, the control signal pTX changes from the high level to the low level, the transfer transistor 102 is turned off, and the transfer of the charges to the floating diffusion region 103 ends. At this time, the voltage VL becomes (Vres−Vth−Vov−Vsig) as represented by the above Equation (14). In addition, the voltage of the output node of the readout circuit 12 is a voltage (V1+Gain×Vsig) as in the Equation (15).

At any one of the timings t211 to t218, the A/D conversion circuit 14 performs A/D conversion on the pixel signal output from the readout circuit 12. The DFE 17 calculates a difference value between a digital value at the time of resetting and a digital value at the time of photoelectric conversion. The difference value is output from the output circuit 171 as a pixel signal.

As described above, in the present embodiment, even when the signal processing circuit 13 is not used, the amplifier 130 continues to operate. Here, it is assumed that power supply current for an unused circuit is cut off or reduced to turn off the unused circuit. In this case, it takes a long time to recover the operation of the circuit, and it may be difficult to seamlessly switch the imaging mode. In addition, fluctuations in current may occur at the time of recovery from the operation of the circuit, and image quality deterioration such as signal fluctuation of other circuits and superposition of pseudo signals may occur. According to the present embodiment, even when the signal processing circuit 13 is not used, the amplifier 130 keeps the operating state. This makes it possible to seamlessly switch the imaging mode, and it is possible to suppress deterioration in image quality at the time of switching the imaging mode. When the recovery time of the amplifier 130 is sufficiently short, the power supply current to the amplifier 130 may be cut off. In this case, current consumption can be reduced.

In the present embodiment, the input voltage of the amplifier 130 is kept constant when the amplifier 130 is not used. If the voltage of the input terminal is indeterminate, the output voltage of the amplifier 130 exceeds the operating range, and the recovery time of the amplifier 130 becomes longer. According to the present embodiment, since the input voltage of the amplifier 130 in the non-use state is kept constant, when the mode is switched from the low gain mode to the high gain mode, the photoelectric conversion device can immediately start imaging without a recovery time of the signal processing circuit 13. Therefore, the gain mode can be switched a frame of moving images.

Further, since the amplifier 130 operates as a voltage follower and a buffer amplifier, the gain in the signal processing circuit 13 keeps "1" in both the case of using the signal processing circuit 13 and the case of not using the signal processing circuit 13. Therefore, it is possible to reduce the amplitude fluctuation of the signal in both the case of using the signal processing circuit 13 and the case of not using the signal processing circuit 13.

As described above, when the signal processing circuit is not used, the amplifier 130 is kept to be in the operating state, and the amplifier 130 outputs a constant voltage. Therefore, the signal processing circuit 13 does not generate noise when the signal processing circuit 13 is not in use. Further, the time required for mode switching can be shortened, and seamless mode switching can be realized.

Therefore, according to the present embodiment, it is possible to solve the problem at the time of recovery of the signal processing circuit.

Second Embodiment

Next, a photoelectric conversion device according to the present embodiment will be described. The photoelectric conversion device of the present embodiment differs from the first embodiment in the configuration and driving method of the signal processing circuit 13. Hereinafter, differences from the first embodiment will be mainly described.

Figure 6:
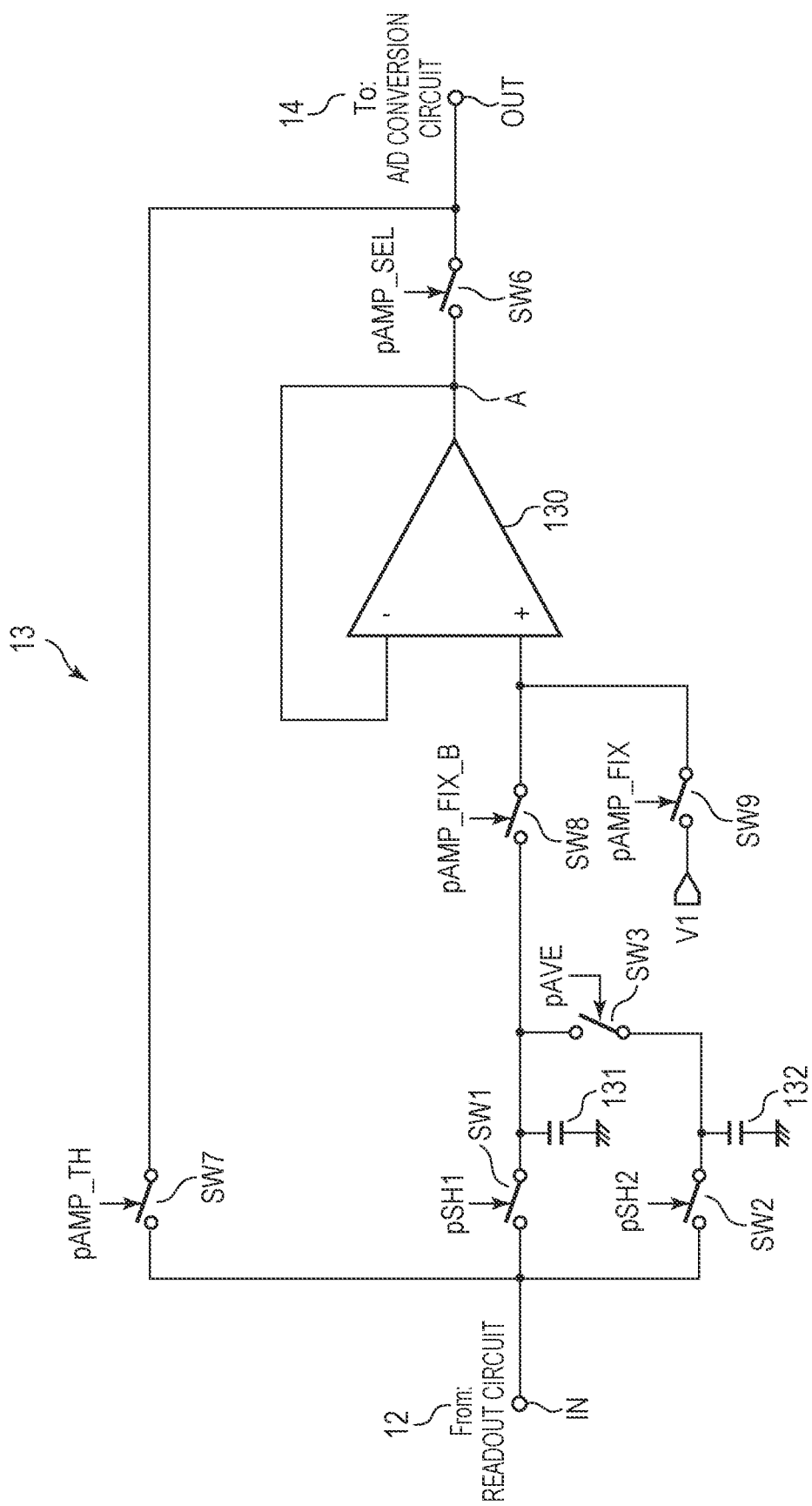
FIG. 6 is a circuit diagram of a signal processing circuit according to the second embodiment.

FIG. 6 is an equivalent circuit diagram of the signal processing circuit 13 in the present embodiment. The signal processing circuit 13 includes an amplifier 130, switches SW1 to SW3, SW6 to SW9, and holding circuits 131 and 132. The inverting input terminal of amplifier 130 is electrically connected to a node A, and the amplifier 130 may operate as a voltage follower.

The switch SW1 (input switch, first switch) is connected in series between the input node IN and the holding circuit 131. The first node of the switch SW1 is connected to the input node IN, i.e., the output node of the readout circuit 12, and the second node of the switch SW1 is connected to the first electrode of the holding circuit 131, the first node of the switch SW3, and the first node of the switch SW8. A second electrode of the holding circuit 131 is connected to a ground node. A control signal pSH1 is input to the control node of the switch SW1. When the control signal pSH1 becomes the high level and the switch SW1 is turned on, a signal from the readout circuit 12 is input to the holding circuit 131. When the control signal pSH1 becomes the low level and the switch SW1 is turned off, the holding circuit 131 holds the signal.

The switch SW2 (input switch, second switch) is connected in series between the input node IN and the holding circuit 132. The first node of the switch SW2 is connected to the input node IN, i.e., the output node of the readout circuit 12, and the second node of the switch SW2 is connected to the first electrode of the holding circuit 132 and the second node of the switch SW3. A second electrode of the holding circuit 132 is connected to the ground node. A control signal pSH2 is input to the control node of the switch SW2. When the control signal pSH2 becomes the high level and the switch SW2 is turned on, a signal from the readout circuit 12 is input to the holding circuit 132. When the control signal pSH2 becomes the low level and the switch SW2 is turned off, the holding circuit 132 holds the signal.

The switch SW3 (third switch) is connected between the holding circuits 131 and 132. A first node of the switch SW3 is connected to a second node of the switch SW1 and a first electrode of the holding circuit 131, and a second node of the switch SW3 is connected to a second node of the switch SW2 and a first electrode of the holding circuit 132. A control signal pAVE is input to the control node of the switch SW3. When the control signal pAVE becomes the high level and the switch SW3 is turned on, the holding circuits 131 and 132 are short-circuited, and the signals of the holding circuits 131 and 132 are averaged. When the control signal pAVE becomes the low level, the switch SW3 is turned off, and the holding circuits 131 and 132 can hold different signals.

The switch SW8 (sixth switch) is connected in series between the holding circuit 131 (132) and the non-inverting input terminal of the amplifier 130. That is, the first node of the switch SW8 is connected to the second node of the switch SW1, the first node of the switch SW3, and the first electrode of the holding circuit 131, and the second node of the switch SW8 is connected to the non-inverting input terminal of the amplifier 130 and the second node of the switch SW9. A control signal pAMP_FIX_B is input to the control node of the switch SW8. When the control signal pAMP_FIX_B becomes the high level and the switch SW8 is turned on, the signal held in the holding circuit 131 (132) is input to the non-inverting input terminal of the amplifier 130. When the control signal pAMP_FIX_B becomes the low level and the switch SW8 is turned off, the non-inverting input terminal of the amplifier 130 is disconnected from the holding circuit 131 (132).

The switch SW9 (the seventh switch) is connected in series between the non-inverting input terminal of the amplifier 130 and a wiring (a constant voltage line) of the voltage V1. A voltage V1 is applied to a first node of the switch SW9, and a second node of the switch SW9 is connected to a non-inverting input terminal of the amplifier 130 and a second node of the switch SW8. A control signal pAMP_FIX is input to the control node of the switch SW9. When the control signal pAMP_FIX becomes the high level and the switch SW9 is turned on, the voltage V1 is applied to the non-inverting input terminal of the amplifier 130. When the control signal pAMP_FIX becomes the low level and the switch SW9 is turned off, the voltage V1 is not applied to the non-inverting input terminal of the amplifier 130. The control signal pAMP_FIX is an inverted signal of the control signal pAMP_FIX_B. That is, when the switch SW8 is turned on, the switch SW9 is turned off. Also, when the switch SW8 is turned off, the switch SW9 is turned on.

The switches SW6 and SW7 are configured in the same manner as in the first embodiment. The switch (output switch) SW6 is connected in series between the output terminal (node A) of the amplifier 130 and the output node OUT. The switch (short-circuit switch) SW7 is connected in series between the input node IN and the output node OUT.

Also in the present embodiment, similarly to the first embodiment, it is possible to switch the signal path in the signal processing circuit 13 according to the readout mode. That is, in the high gain mode (first operation mode), noise reduction is performed using the holding circuits 131 and 132 and the amplifier 130, and in the low gain mode (second operation mode), the holding circuits 131 and 132 and the amplifier 130 are disconnected from the signal path.

Figure 7:
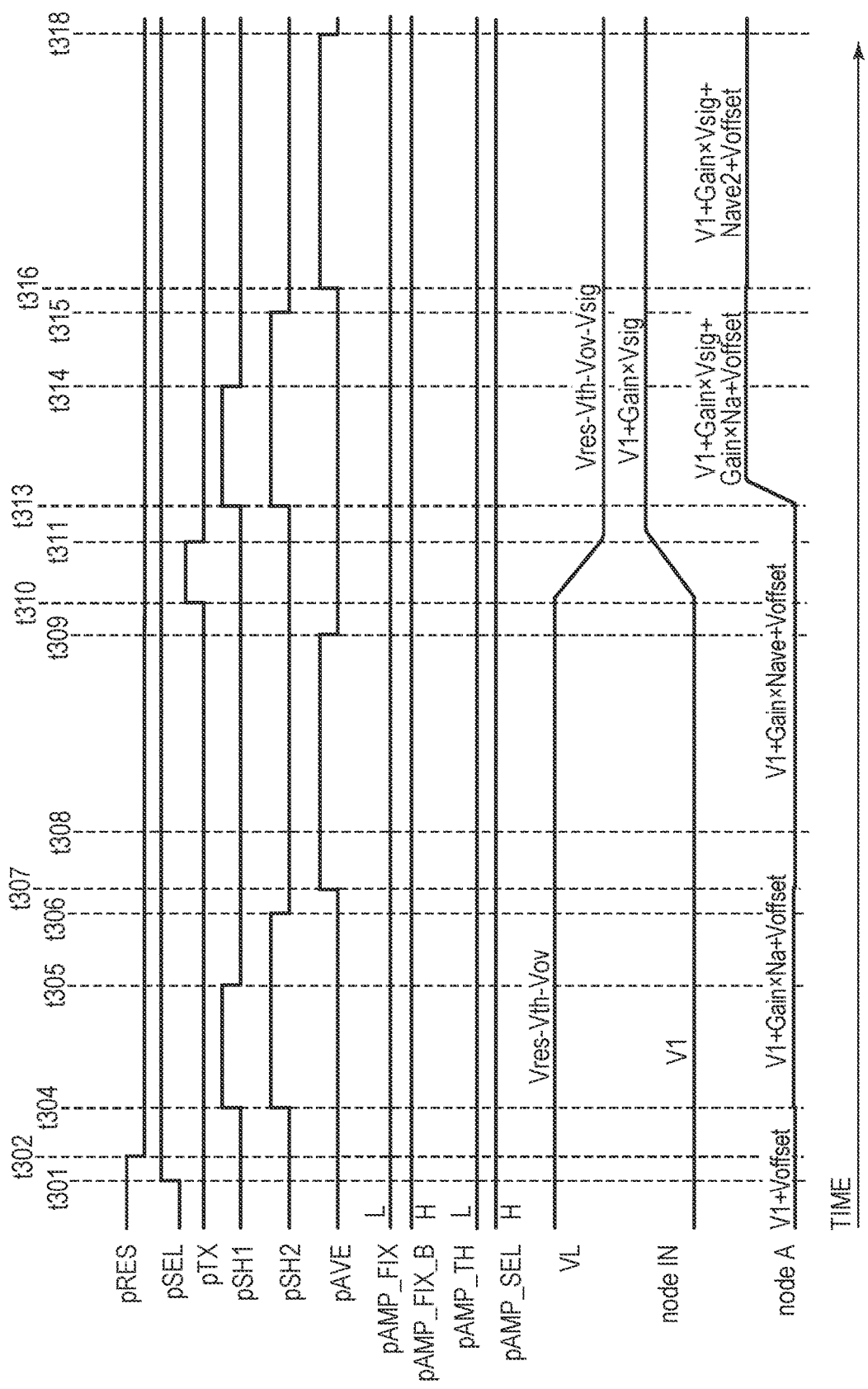
FIG. 7 is a timing chart illustrating a driving method of the photoelectric conversion device according to the second embodiment.

FIG. 7 is a timing chart showing the driving method of the photoelectric conversion device according to the present embodiment, and illustrates the driving method in the high gain mode. In the high gain mode, the control signal pAMP_TH holds the low level, and the control signal pAMP_SEL holds the high level. Therefore, a signal path for short-circuiting the input node IN and the output node OUT, that is, a signal path for bypassing the holding circuits 131 and 132 and the amplifier 130 is cut off. The control signal pAMP_FIX holds the low level, and the switch SW9 keeps the off state. The control signal pAMP_FIX_B, which is an inverted signal of the control signal pAMP_FIX, holds the high level, and the switch SW8 is turned on. Therefore, in the high gain mode, the voltage V1 is not input to the non-inverting input terminal of the amplifier 130.

At time t301, the control signal pRES is at the high level, the reset transistor 106 of the pixel 100 is turned on, and the floating diffusion region 103 is reset. Further, the control signal pSEL changes from the low level to the high level, the selection transistor 105 of the pixel 100 is turned on, and the amplification transistor 104 and the signal line L are electrically connected to each other. Thus, a pixel signal at the time of resetting is output from the pixel 100 to the signal line L. At this time, when the reset level of the floating diffusion region 103 is Vres, the threshold value of the amplification transistor 104 is Vth, and the overdrive voltage for passing a desired current I is Vov, the voltage VL in the signal line L is (Vres−Vth−Vov) represented by the above Equation (1). In the signal processing circuit 13, since the control signals pSH1 and pSH2 are at the low level, the switches SW1 and SW2 are turned off. At this time, when the voltage V1 is held in the holding circuit 131, the voltage Va of the node A becomes (V1+Voffset).

At time t302, the control signal pRES changes from the high level to the low level, the reset transistor 106 is turned off, and the floating diffusion region 103 is in the floating state.

At time t304, the control signals pSH1 and pSH2 change from the low level to the high level, and the switches SW1 and SW2 are turned on. The input node IN and the holding circuits 131 and 132 are electrically connected to each other, and a signal at the time of resetting is output from the readout circuit 12 to the holding circuits 131 and 132.

At time t305, the control signal pSH1 changes from the high level to the low level, the switch SW1 is turned off, and the voltage of the input node IN is held in the holding circuit 131. At this time, the voltage held in the holding circuit 131 is a voltage (V1+Gain×Na) as in the above Equation (3). When the amplifier 130 has the offset voltage Voffset and the voltage of the pixel signal (noise signal) at time t305 is Na, the voltage of the node A is represented by the Equation (22).

$$V1+Gain \times Na+Voffset \quad (22)$$

At time t306, the control signal pSH2 changes from the high level to the low level, the switch SW2 is turned off, and the voltage of the output node of the readout circuit 12 is held in the holding circuit 132. When the voltage of the pixel signal (noise signal) at the time t306 is Nb, the voltage held in the holding circuit 132 becomes a voltage (V1+Gain×Nb) as in the Equation (5). At this time, the switch SW3 is in the off state, and the holding circuit 132 is not electrically connected to the non-inverting input terminal of the amplifier 130. Therefore, the node A holds the voltage of the Equation (22).

At time t307, the control signal pAVE changes from the low level to the high level, the switch SW3 is turned on, and the signals held in the holding circuit 131 and the holding circuit 132 are averaged. That is, the voltage (V1+Gain×Na) of the Equation (3) and the voltage (V1+Gain×Nb) of the Equation (5) are averaged. Unlike the Equation (12) of the first embodiment, the averaged voltage is represented by the Equation (23) including V1.

$$V1+\text{Equation (12)}=V1+(Gain \times Na)/\sqrt{2} \quad (23)$$

As in the first embodiment, according to the Equation (23), it is possible to reduce the noise of a period shorter than the time period from the falling time (time t305) of the control signal pSH1 to the falling time (time t306) of the control signal pSH2. That is, a high frequency noise can be reduce to $(1/\sqrt{2})$. On the other hand, the Equation (23) cannot average the noise with a period longer than the period from time t305 to time t306. That is, the Equation (23) does not average a noise with a lower frequency. Thus, the low frequency noise may actually be greater than the squared average $(1/\sqrt{2})$.

The voltage Va of the node A of the amplifier 130 is represented by the Equation (24).

$$Va = V1 + Nave + Voffset \quad (24)$$

From time t308 to time t309, the A/D conversion circuit 14 performs A/D conversion on the output signal from the signal processing circuit 13, i.e., the voltage Va of the Equation (24).

At time t309, the control signal pAVE changes from the high level to the low level, and the switch SW3 is turned off.

At time t310, the control signal pTX changes from the low level to the high level, the transfer transistor 102 in the pixel 100 is turned on, and the charge accumulated in the photoelectric conversion circuit 101 is transferred to the floating diffusion region 103. The potential of the floating diffusion region 103 decreases according to the transferred charge, and the voltage VL of the signal line L also decreases. The amount of change in the voltage VL of the signal line L at this time is represented by Vsig.

At time t311, the control signal pTX changes from the high level to the low level, the transfer transistor 102 is turned off, and a transfer of the charges to the floating diffusion region 103 ends. At this time, the voltage VL of the signal line L is represented by the voltage (Vres−Vth−Vov−Vsig) of the Equation (14). The voltage of the input node IN, that is, the voltage of the output node of the readout circuit 12 is the voltage (V1+Gain×Vsig) of the Equation (15).

At time t313, the control signals pSH1 and pSH2 change from the low level to the high level, the switches SW1 and SW2 are turned on, and the first electrodes of the holding circuits 131 and 132 are electrically connected to the input node IN. The voltage (V1+Gain×Vsig) of the Equation (15) is output to the first electrodes of the holding circuits 131 and 132, respectively.

At time t314, the control signal pSH1 changes from the high level to the low level, the switch SW1 is turned off, and the holding circuit 131 holds the voltage of the input node IN. At this time, the voltage held in the holding circuit 131 is the voltage (V1+Gain×Nc+Gain×Vsig) of the Equation (16). The voltage Va of the node A is represented by the Equation (25).

$$Va = V1 + Gain \times Nc + Gain \times Vsig + Voffset \quad (25)$$

At time t315, the control signal pSH2 changes from the high level to the low level, the switch SW2 is turned off, and the holding circuit 132 holds the voltage of the input node. At this time, the voltage held in the holding circuit 132 is a voltage (V1+Gain×Nd+Gain×Vsig) as in the Equation (18). At this time, since the switch SW3 is in the off state, the holding circuit 132 is not electrically connected to the non-inverting terminal of the amplifier 130. Therefore, the node A holds the voltage of the Equation (25).

At time t316, the control signal pAVE changes from the low level to the high level, the switch SW3 is turned on, and the signals held in the holding circuits 131 and 132 are averaged. The averaged signal is represented by the Equation (26) in which the voltage V1 is added to the Equation (20).

$$V1 + \text{Equation (20)} = V1 + \text{Gain} \times V\text{sig} + (\text{Gain} \times Nc)/\sqrt{2} \quad (26)$$

When the noise component $((\text{Gain} \times Nc)/\sqrt{2})$ in the Equation (26) is replaced with Nave2, the voltage Va of the node A is represented by the Equation (27).

$$Va = V1 + \text{Gain} \times V\text{sig} + N\text{ave}2 + V\text{offset} \quad (27)$$

From time t316 to time t318, the A/D conversion circuit 14 performs A/D conversion of the voltage Va described in the Equation (27). At time t318, the control signal pAVE changes from the high level to the low level, and the switch SW3 is turned off. Then, the DFE 17 calculates a difference value between the digital value (Equation (24)) at the time of resetting and the digital value (Equation (27)) at the time of photoelectric conversion, and the DFE 17 performs correlated double sampling. The difference value is output from the output circuit 171 as a pixel signal.

Also in the present embodiment, noise reduction of a signal can be realized by using the amplifier 130 and the holding circuits 131 and 132 in the high gain mode. As described above, in the low gain mode, kTC noise in the holding circuits 131 and 132 may not be ignored. Therefore, also in the present embodiment, it is preferable that the amplifier 130 and the holding circuits 131 and 132 are not used in the low gain mode.

Figure 8:
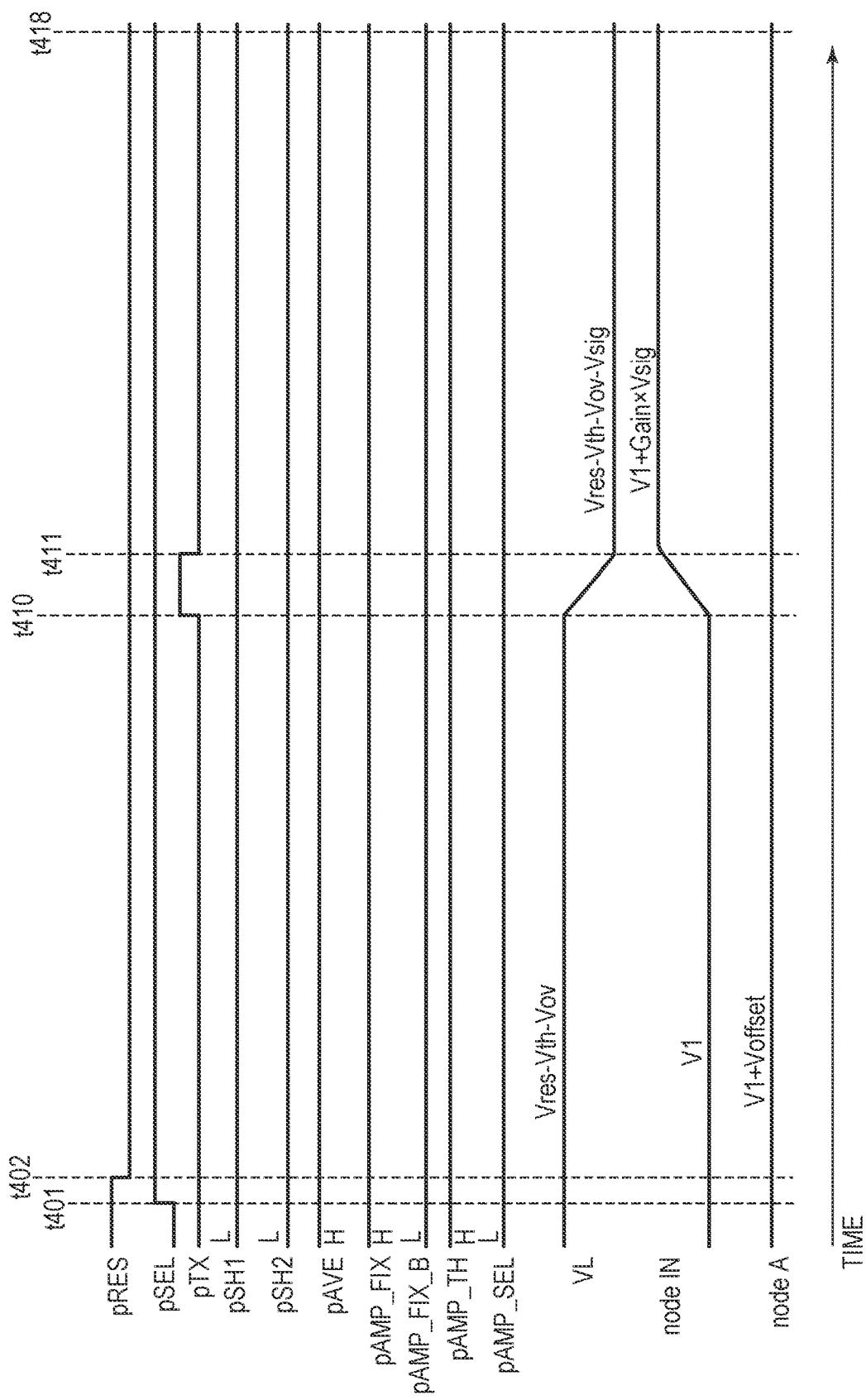
FIG. 8 is a timing chart illustrating a driving method of the photoelectric conversion device according to the second embodiment.

FIG. 8 is a timing chart illustrating the driving method of the photoelectric conversion device according to the present embodiment, and illustrates the driving method in the low gain mode. In the low gain mode, the control signal pAMP_TH holds the high level, and the switch SW7 keeps the on state. Further, the control signal pAMP_SEL holds the low level, and the switch SW6 keeps the off state. Therefore, a signal path for short-circuiting the input node IN to the output node OUT of the signal processing circuit 13 is formed, and the holding circuits 131 and 132 and the amplifier 130 are isolated from the signal path. Therefore, the signal of the output node of the readout circuit 12 is directly output to the A/D conversion circuit 14 via the switch SW7.

The control signal pAMP_FIX holds the high level, and the switch SW9 keeps the on state. The control signal pAMP_FIX_B holds the low level, and the switch SW8 keeps the off state. Thereby, the non-inverting input terminal of the amplifier 130 is disconnected from the holding circuits 131 and 132 and connected to the voltage V1. Therefore, the amplifier 130 continues to operate as a voltage follower that outputs a voltage (V1−Voffset). However, the voltage of the node A is not output to the outside of the signal processing circuit 13.

In the timing chart of FIG. 8, the holding circuits 131 and 132 and the amplifier 130 are not used, and the readout circuit 12 and the A/D conversion circuit 14 process signals without passing through the signal processing circuit 13. At time t401, the control signal pSEL changes from the low level to the high level, and a pixel signal at the time of resetting is output from the pixel 100 to the signal line L. The voltage VL of the signal line L becomes (Vres−Vth−Vov) as represented by the above Equation (1).

At time t402, the control signal pRES changes from the high level to the low level, and the reset transistor 106 is turned off. The readout circuit 12 clamps the pixel signal at the reset time to the voltage V1. The voltage of the output node of the readout circuit 12 is (V1+Gain×Na) as represented by the above Equation (3). At any one of the timings t402 to t410, the A/D conversion circuit 14 performs A/D conversion on the pixel signal output from the readout circuit 12.

At times t410 to t411, the control signal pTX becomes the high level, and the pixel signal at the time of photoelectric conversion is read out. At time t411, the voltage VL of the signal line L becomes (Vres−Vth−Vov−Vsig) as represented by the above Equation (14). In addition, the voltage of the output node of the readout circuit 12 is a voltage (V1+Gain×Vsig) as in the Equation (15).

At any one of the timings t411 to t418, the A/D conversion circuit 14 performs A/D conversion on the pixel signal output from the readout circuit 12. The DFE 17 calculates a difference value between a digital value at the time of resetting and a digital value at the time of photoelectric conversion. The difference value is output from the output circuit 171 as a pixel signal.

Also in the present embodiment, as in the above-described embodiment, it is possible to solve the problem at the time of recovery of the signal processing circuit 13. When the signal processing circuit 13 is not used, the amplifier 130 is in an operating state, and the voltage of the input terminal of the amplifier 130 is kept constant. Therefore, when the signal processing circuit 13 is not used, the signal processing circuit 13 does not cause a noise. Further, seamless mode switching can be realized without requiring time for mode switching. When the recovery time of the amplifier 130 is sufficiently short, the power supply current to the differential amplifier 130 may be cut off. In this case, current consumption can be reduced.

Although the control signals pSH1 and pSH2 hold the low level in FIG. 8, the control signals pSH1 and pSH2 may hold the high level, and the switches SW1 and SW2 may be kept in the on state. In this case, the frequency band of the signal of the readout circuit 12 is shifted to a lower frequency, and a high frequency noise can be reduced. On the other hand, in the first embodiment, each of the holding circuits 131 and 132 is connected in series to the signal path. Here, in order to connect the holding circuits 131 and 132 in parallel between the signal path and the ground node, another switch is required, and the circuit scale may increase. According to the present embodiment, it is possible to increase the noise reduction effect in the low gain mode while suppressing the circuit scale.

Third Embodiment

Next, a photoelectric conversion device according to the present embodiment will be described. The photoelectric conversion device of the present embodiment differs from the second embodiment in the driving method in the low gain mode. The circuit configuration of the photoelectric conversion device in the present embodiment and the driving method in the high gain mode are similar to those in the second embodiment. Hereinafter, the present embodiment will be described mainly with respect to differences from the second embodiment.

Figure 9:
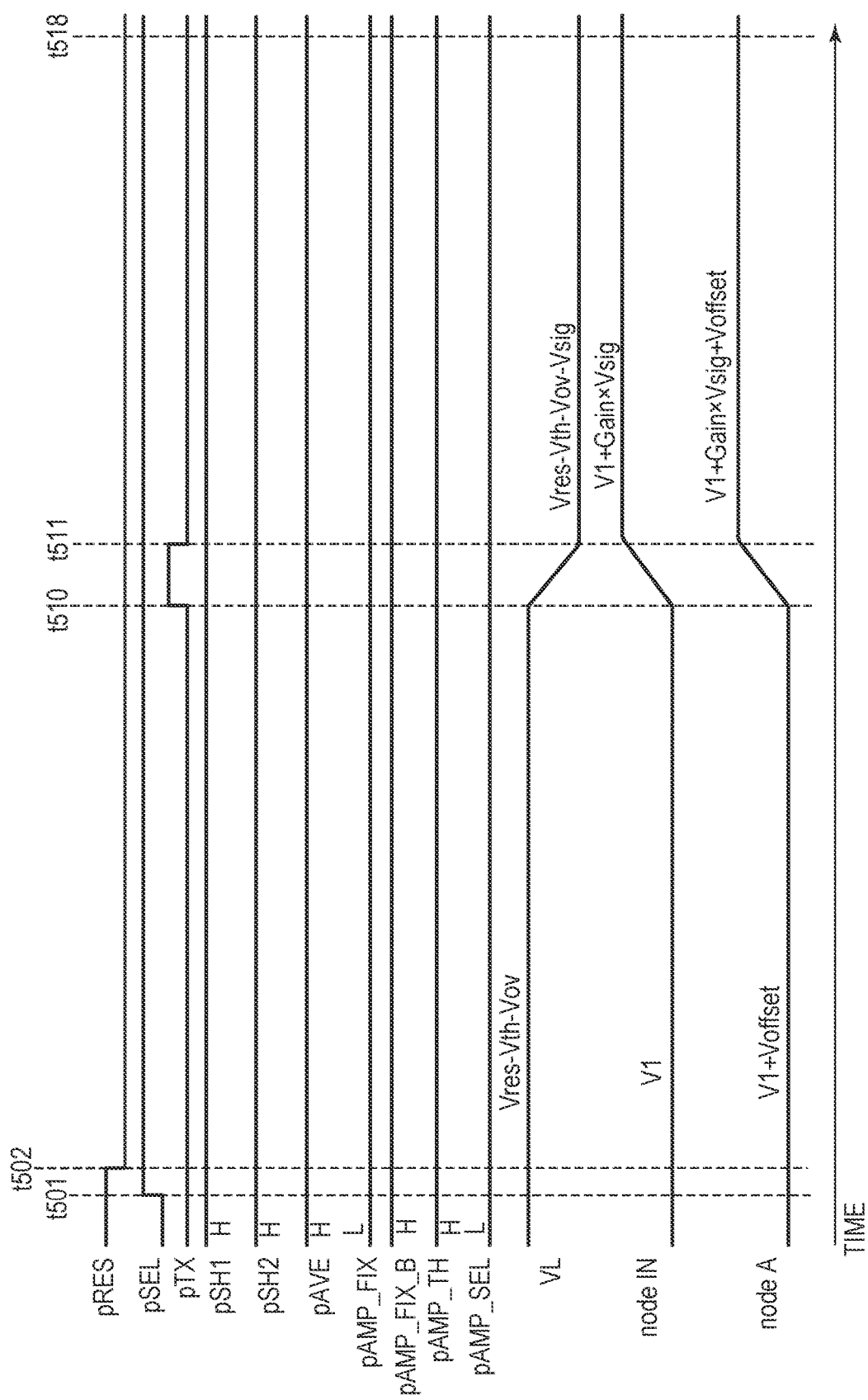
FIG. 9 is a timing chart illustrating a driving method of the photoelectric conversion device according to the third embodiment.

FIG. 9 is a timing chart illustrating the driving method of the photoelectric conversion device according to the present embodiment, and illustrates the driving method in the low gain mode. The control signal pAMP_TH holds the high level, and the switch SW7 keeps the on state. Further, the control signal pAMP_SEL holds the low level, and the switch SW6 keeps the off state. Therefore, a signal path directly connecting from the input node IN to the output node OUT of the signal processing circuit 13 is formed, and the holding circuits 131 and 132 and the amplifier 130 are isolated from the signal path. Therefore, the signal of the output node of the readout circuit 12 is directly output to the A/D conversion circuit 14 via the switch SW7.

On the other hand, unlike the second embodiment, the control signals pSH1, pSH2, and pAVE hold the high level, and the control signal pAMP_FIX hold the low level. The control signal pAMP_FIX_B, which is an inverted signal of the control signal pAMP_FIX, holds the high level. The switches SW1, SW2, and SW3 keep the on state, and the input node IN is electrically connected to the non-inverting input terminal of the amplifier 130. Thereby, the amplifier 130 operates as a voltage follower and outputs a voltage corresponding to the voltage of the readout circuit 12. Also in the present embodiment, the voltage of the node A is not output to the outside of the signal processing circuit 13.

At time t501, the control signal pSEL changes from the low level to the high level, and a pixel signal at the time of resetting is output from the pixel 100 to the signal line L. At time t502, the control signal pRES changes from the high level to the low level, and the reset transistor 106 is turned off. The readout circuit 12 clamps the pixel signal at the reset time to the voltage V1. As described above, since the switches SW1, SW2, and SW3 keep the on state, the voltage V1 from the readout circuit 12 is input to the non-inverting input terminal of the amplifier 130. The amplifier 130 outputs a voltage (V1+Voffset). At any one of the timings t502 to t510, the A/D conversion circuit 14 performs A/D conversion on the pixel signal output from the readout circuit 12.

At times t510 to t511, the control signal pTX becomes the high level, and a signal at the time of photoelectric conversion is read out. At time t511, the voltage VL of the signal line L becomes (Vres−Vth−Vov−Vsig) as represented by the Equation (14). The voltage of the output node of the readout circuit 12, i.e., the voltage of the input node IN, is a voltage (V1+Gain×Vsig) as in the Equation (15). The voltage of the node A is (V1+Gain×Vsig+Voffset).

At any one of the timings t511 to t518, the A/D conversion circuit 14 performs A/D conversion on the pixel signal output from the readout circuit 12. The DFE 17 calculates a difference value between a digital value at the time of resetting and a digital value at the time of photoelectric conversion. The difference value is output from the output circuit 171 as a pixel signal.

As described above, although the signal processing circuit 13 is not used in the low gain mode, the signal of the readout circuit 12 is input to the non-inverting input terminal of the amplifier 130. Therefore, the output voltage of the amplifier 130 changes according to the input signal. However, since the switch SW6 is in the off state, the output terminal (node A) of the amplifier 130 is isolated from the output node OUT. The output voltage of the amplifier 130 changes in phase with the output voltage of the readout circuit 12. Therefore, the amplifier 130 has little influence on subsequent circuits.

Also in the present embodiment, since the amplifier 130 is kept to operate, imaging can be started immediately at the time of switching from the low gain mode to the high gain mode without requiring a recovery time of the circuits. When the recovery time of the circuit at the time of switching the imaging mode is sufficiently short, the power supply current of the amplifier 130 may be cut off or reduced.

Fourth Embodiment

The photoelectric conversion device of the above embodiments can be applied to various imaging systems. Examples of the imaging system include a digital still camera, a digital camcorder, a camera head, a copying machine, a facsimile, a mobile phone, a vehicle-mounted camera, an observation satellite, and a monitoring camera. FIG. is a block diagram of a digital still camera as an example of equipment.

Figure 10:
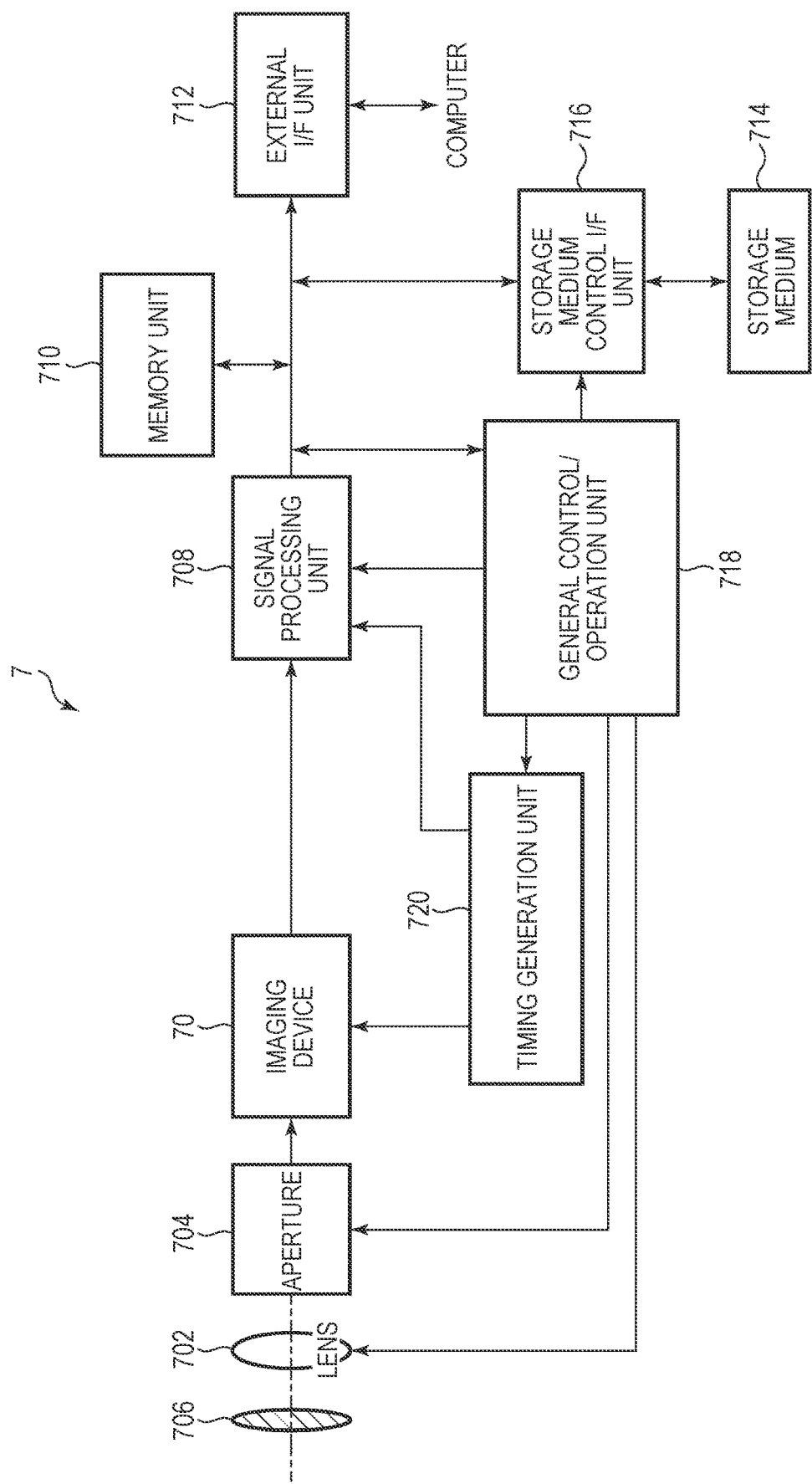
FIG. 10 is a block diagram of equipment according to the fourth embodiment.

Equipment 7 as shown in FIG. 10 includes a barrier 706, a lens 702, an aperture 704, an imaging device 70 (an example of the photoelectric conversion device), a signal processing unit or circuit (processing device) 708, a timing generation unit or circuit 720, a general control/calculation unit or circuit (control device) 718, a memory unit or circuit (storage device) 710, a storage medium control I/F unit 716, a storage medium 714, and an external I/F unit or circuit 712. At least one of the barrier 706, the lens 702 and the aperture 704 is the optical device corresponding to the equipment. The barrier 706 protects the lens, and the lens 702 forms an optical image of a subject on the imaging device 70. The aperture 704 varies the amount of light passing through the lens 702. The imaging device 70 is configured as in the photoelectric conversion device of the above embodiments, and converts an optical image formed by the lens 702 into image data (image signal). Here, it is assumed that an AD (analog to digital) conversion unit or circuit is formed on the semiconductor substrate of the imaging device 70. The signal processing unit or circuit 708 performs a data compression or various corrections on the imaging data output from the imaging device 70. The timing generation unit or circuit 720 outputs various timing signals to the imaging device 70 and the signal processing unit or circuit 708. The general control/calculation unit or circuit 718 controls the entire digital still camera, and the memory unit 710 temporarily stores image data. The storage medium control I/F unit or circuit 716 is an interface for storing or reading image data on the storage medium 714, and the storage medium 714 is a detachable storage medium such as a semiconductor memory for storing or reading captured image data. The external OF unit or circuit 712 is an interface for communicating with an external computer or the like. The timing signal or the like may be input from the outside of the imaging system. Furthermore, the equipment 7 may include a display device (monitor, electronic viewfinder, etc.) for displaying information obtained by the photoelectric conversion device. The equipment includes at least the photoelectric conversion device. The equipment may also include at least one of an optical device, a control device, a processing device, a display device, a storage device, and a mechanical device to operate based on the information obtained by the photoelectric conversion device. The mechanical device may be a movable unit or assembly (e.g., a robotic arm) that operates based on the signal from the photoelectric conversion device.

The imaging device 70 and the A/D conversion unit or circuit are provided on different semiconductor substrates, but the imaging device 70 and the A/D conversion unit or circuit may be formed on the same semiconductor substrate. Also, the imaging device 70 and the signal processing unit or circuit 708 may be formed on the same semiconductor substrate.

Each pixel may include a first photoelectric conversion portion or circuit and a second photoelectric conversion portion or circuit. The signal processing unit or circuit 708 processes the pixel signal based on the charge generated in the first photoelectric conversion circuit and the pixel signal based on the charge generated in the second photoelectric conversion circuit, and acquires the distance information from the imaging device 70 to the subject.

Fifth Embodiment

Figure 11A:
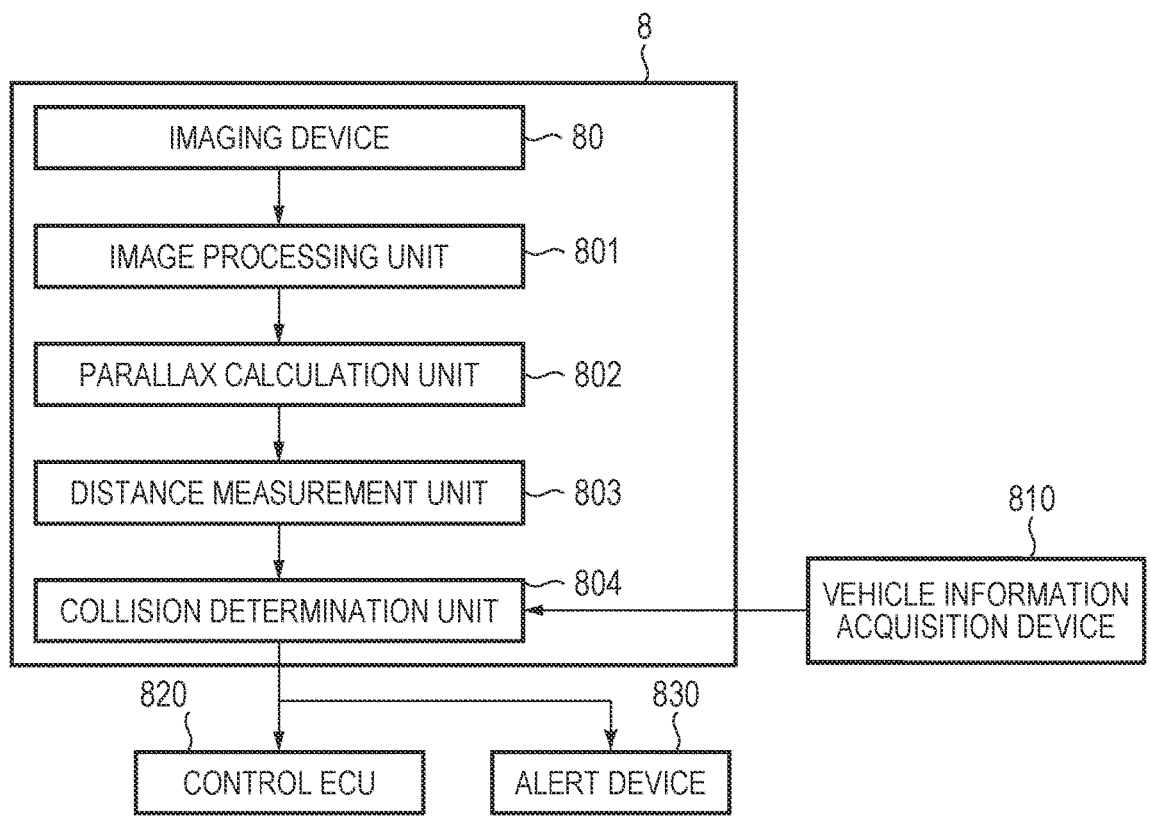
FIG. 11A is a block diagram of equipment relating to a vehicle-mounted camera according to the fifth embodiment.
Figure 11B:
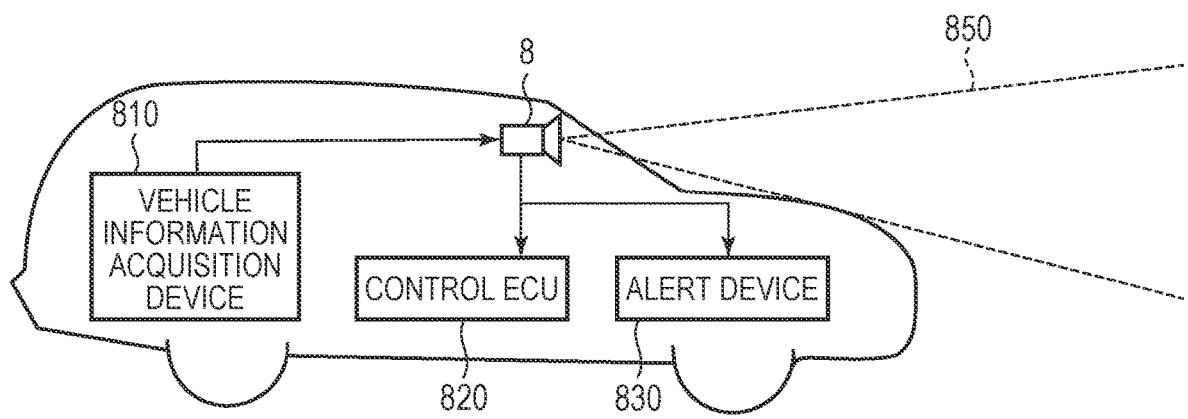
FIG. 11B is a block diagram of equipment relating to a vehicle-mounted camera according to the fifth embodiment.

FIGS. 11A and 11B illustrate a block diagram of equipment relating to the vehicle-mounted camera according to the present embodiment. The equipment 8 includes the imaging device 80 (an example of a photoelectric conversion device) of the above-described embodiment and a signal processing device (processing device) that processes a signal from the imaging device 80. The equipment 8 includes an image processing unit or circuit 801 that performs image processing on a plurality of pieces of image data acquired by the imaging device 80, and a parallax calculation unit or circuit 802 that calculates parallax (phase difference of parallax images) from the plurality of pieces of image data acquired by the equipment 8. The equipment 8 includes a distance measurement unit or circuit 803 that calculates a distance to the object based on the calculated parallax, and a collision determination unit or circuit 804 that determines whether or not there is a possibility of collision based on the calculated distance. Here, the parallax calculation unit or circuit 802 and the distance measurement unit or circuit 803 are examples of a distance information acquisition unit or circuit that acquires distance information to an object. That is, the distance information is information on a parallax, a defocus amount, a distance to an object, and the like. The collision determination unit or circuit 804 may determine the possibility of collision using any of these pieces of distance information. The distance information acquisition means may be implemented by dedicated hardware or software modules. Further, it may be realized by FPGA (Field Programmable Gate Array), ASIC (Application Specific Integrated Circuit) or a combination thereof.

The equipment 8 is connected to the vehicle information acquisition device 810, and can obtain vehicle information such as a vehicle speed, a yaw rate, and a steering angle. The equipment 8 is connected to a control ECU 820 which is a control device that outputs a control signal for generating a braking force to the vehicle based on the determination result of the collision determination unit or circuit 804. The equipment 8 is also connected to an alert device 830 that issues an alert to the driver based on the determination result of the collision determination unit or circuit 804. For example, when the collision possibility is high as the determination result of the collision determination unit or circuit 804, the control ECU 820 performs vehicle control to avoid collision and reduce damage by braking, returning an accelerator, suppressing engine output, or the like. The alert device 830 alerts the user by sounding an alert such as a sound, displaying alert information on a screen of a car navigation system or the like, or giving vibration to a seat belt or a steering wheel. The equipment 8 functions as a control device for controlling the operation of controlling the vehicle as described above.

In the present embodiment, an image of the periphery of the vehicle, for example, the front or the rear is captured by the equipment 8. FIG. 11B illustrates the equipment in a case where an image is captured in front of the vehicle (image capturing range 850). The vehicle information acquisition device 810 as the imaging control means sends an instruction to the equipment 8 or the imaging device 80 to perform the operation described in the first to fourth embodiments. With such a configuration, the accuracy of distance measurement can be further improved.

In the above description, an example has been described in which control is performed so as not to collide with other vehicles, but the present disclosure can also be applied to control of automatic driving following other vehicles, control of automatic driving so as not to go out of a lane, and the like. Further, the equipment is not limited to a vehicle such as an automobile, and can be applied to a mobile body (moving device) such as a ship, an aircraft, an artificial satellite, an industrial robot, or a consumer robot. In addition, the present disclosure can be applied not only to a mobile body but also to a wide variety of equipment using object recognition or biological recognition, such as an intelligent transport systems (ITS) and a surveillance system.

Other Embodiments Thereof

The amplifier 130 in the signal processing circuit 13 may have either a single-ended input terminal or differential input terminals. The signal processing circuit 13 is not limited to a circuit that samples and holds a signal. For example, the signal processing circuit 13 may include a clamp circuit that clamps a signal read out from the pixel 100, an amplifier circuit that amplifies the amplitude of the signal, a circuit that generates a reference signal, and a constant voltage circuit that generates a bias voltage. Further, the signal processing circuit 13 is not limited to an analog circuit, and may be a pulse circuit or a digital circuit.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-029296, filed Feb. 28, 2022, which is hereby incorporated by reference herein in its entirety.

What is claimed is:

1. A photoelectric conversion device comprising:
   a signal line;
   a pixel including a photoelectric conversion portion configured to generate charges based on incident light, and an amplification transistor configured to output, the signal line, a signal according to an amount of the charges;
   an input node electrically connected to the signal line, and configured to input the signal;
   a holding circuit configured to hold the signal input to the input node;
   an amplifier configured to input the signal held in the holding circuit;
   an output node configured to output the signal from the amplifier;
   an input switch connected in series between the input node and the holding circuit; and
   an output switch connected in series between the amplifier and the output node,
   wherein, in a first operation mode, the output switch is in an on state, and the input switch is turned on or off at a predetermined timing to hold the signal in the holding circuit, and
   wherein, in a second operation mode, the input switch and the output switch are in an off state and the amplifier outputs a constant voltage.

2. The photoelectric conversion device according to claim 1, wherein, in the second operation mode, the holding circuit and the amplifier are not used in circuit assemblies other than the holding circuit and the amplifier.

3. The photoelectric conversion device according to claim 1, further comprising a readout circuit configured to read out the signal from the pixel, amplify the read out signal with a predetermined gain, and output the amplified signal to the input node,
   wherein the gain in the first operation mode is greater than the gain in the second operation mode.

4. The photoelectric conversion device according to claim 1, further comprising a short-circuit switch connected in series between the input node and the output node,
   wherein, in the second operation mode, the short-circuit switch is in an on state.

5. The photoelectric conversion device according to claim 1,
   wherein the holding circuit includes a first holding circuit and a second holding circuit,
   wherein the input switch includes a first switch connected in series between the input node and the first holding circuit, and a second switch connected in series between the input node and the second holding circuit.

6. The photoelectric conversion device according to claim 1, wherein a timing of turning off the first switch and a timing of turning off the second switch are different from each other.

7. The photoelectric conversion device according to claim 1, further comprising a third switch configured to connect the first holding circuit and the second holding circuit in parallel,
   wherein the third switch is turned on after the first switch and the second switch are turned off.

8. The photoelectric conversion device according to claim 7, further comprising a conversion circuit configured to convert the signal output from the output node into a digital signal,
   wherein, when the third switch is in an on state, the conversion circuit converts the signal into the digital signal.

9. The photoelectric conversion device according to claim 1, wherein the holding circuit is connected in series between the input node and the amplifier.

10. The photoelectric conversion device according to claim 9, further comprising:
    a fourth switch connected in series between an inverting input terminal and an output terminal of the amplifier; and
    a fifth switch connected in series between a connection node of the holding circuit and the input switch and the output terminal.

11. The photoelectric conversion device according to claim 10,
    wherein, when the input switch is in an on state, the fourth switch is in an on state and the fifth switch is in an off state.

12. A photoelectric conversion device comprising:
    a signal line;
    a pixel including a photoelectric conversion portion configured to generate charges based on incident light, and an amplification transistor configured to output, to the signal line, a signal according to an amount of the charges;
    an input node electrically connected to the signal line, and configured to input the signal;
    a holding circuit configured to hold the signal input to the input node;

an amplifier configured to input the signal held in the holding circuit;
an output node configured to output the signal from the amplifier;
an input switch connected in series between the input node and the holding circuit; and
an output switch connected in series between the amplifier and the output node,
wherein, in a first operation mode, the output switch is in an on state, and the input switch is turned on or off at a predetermined timing to hold the signal in the holding circuit, and
wherein, in a second operation mode, the output switch is an off state and the input switch is on state to input the signal of the input node to the amplifier.

13. The photoelectric conversion device according to claim 12, wherein, in the second operation mode, the holding circuit and the amplifier are not used in circuits other than the holding circuit and the amplifier.

14. The photoelectric conversion device according to claim 12, further comprising a read out circuit configured to read out the signal from the pixel, amplify the read out signal with a predetermined gain, and output the amplified signal to the input node,
wherein the gain in the first operation mode is greater than the gain in the second operation mode.

15. The photoelectric conversion device according to claim 12, wherein the holding circuit is connected between the input node and a ground node.

16. The photoelectric conversion device according to claim 15,
wherein an output terminal of the amplifier is connected to an inverting input terminal, further comprising:
a sixth switch connected in series between a non-inverting input terminal of the amplifier and the holding circuit; and
a seventh switch connected in series between the non-inverting input terminal and a predetermined constant voltage line.

17. The photoelectric conversion device according to claim 16,
wherein, in the first operation mode, the sixth switch is in an on state, and the seventh switch is in an off state, and
wherein, in the second operation mode, the sixth switch is in an off state and the seventh switch is in an on state.

18. The photoelectric conversion device according to claim 12,
wherein the amplifier operates as a voltage follower.

19. An apparatus comprising:
the photoelectric conversion device according to claim 1; and
at least one of:
an optical device corresponding to the photoelectric conversion device;
a control device configured to control the photoelectric conversion device;
a processing device configured to process a signal output from the photoelectric conversion device;
a display device configured to display information obtained by the photoelectric conversion device;
a storage device configured to store information obtained by the photoelectric conversion device; and
a mechanical device configured to operate based on the information obtained by the photoelectric conversion device.

20. The apparatus according to claim 19,
wherein the pixel includes a plurality of photoelectric conversion circuits, and
wherein the processing device processes the signals generated by the plurality of photoelectric conversion circuits, and acquires distance information from the photoelectric conversion device to an object.

21. An apparatus comprising:
the photoelectric conversion device according to claim 12; and
at least one of:
an optical device corresponding to the photoelectric conversion device;
a control device configured to control the photoelectric conversion device;
a processing device configured to process a signal output from the photoelectric conversion device;
a display device configured to display information obtained by the photoelectric conversion device;
a storage device configured to store the information obtained by the photoelectric conversion device; and
a mechanical device to operate based on the information obtained by the photoelectric conversion device.

22. The apparatus according to claim 21,
wherein the pixel includes a plurality of photoelectric conversion circuits, and
wherein the processing device processes the signals generated by the plurality of photoelectric conversion circuits, and acquires distance information from the photoelectric conversion device to an object.

* * * * *